(12) United States Patent
Li et al.

(10) Patent No.: US 6,674,504 B1
(45) Date of Patent: Jan. 6, 2004

(54) SINGLE LAYER MULTI-STATE ULTRA-FAST CHOLESTERIC LIQUID CRYSTAL DEVICE AND THE FABRICATION METHODS THEREOF

(75) Inventors: Le Li, Yorktown Heights, NY (US); Deng-Ke Yang, Hudson, OH (US)

(73) Assignee: Kent Optronics, Inc., Fishkill, NY (US)

( * ) Notice: Subject to any disclaimer, the term of this patent is extended or adjusted under 35 U.S.C. 154(b) by 87 days.

(21) Appl. No.: 09/968,191

(22) Filed: Oct. 1, 2001

Related U.S. Application Data

(60) Provisional application No. 60/236,992, filed on Sep. 29, 2000.

(51) Int. Cl.[7] .......................... C09K 19/60; C09K 19/02
(52) U.S. Cl. ........................ 349/169; 349/175; 349/185
(58) Field of Search ................................. 349/185, 169, 349/175

(56) References Cited

U.S. PATENT DOCUMENTS

| | | | |
|---|---|---|---|
| 5,200,845 A | 4/1993 | Crooker et al. | ................ 359/51 |
| 5,251,048 A | 10/1993 | Doane et al. | .................. 359/51 |
| 5,384,067 A | 1/1995 | Doane et al. | ........... 252/299.01 |
| 5,437,811 A | 8/1995 | Doane et al. | ........... 252/299.01 |
| 5,453,863 A | 9/1995 | West et al. | ..................... 359/91 |
| 5,661,533 A | * 8/1997 | Wu et al. | .................... 349/169 |
| 5,680,233 A | 10/1997 | Faris et al. | .................... 359/41 |
| 5,691,789 A | 11/1997 | Li et al. | ......................... 349/98 |
| 5,695,682 A | 12/1997 | Doane et al. | ........... 252/299.01 |
| 5,748,277 A | 5/1998 | Huang et al. | ................ 349/169 |
| 5,847,798 A | 12/1998 | Yang et al. | .................... 349/169 |
| 5,852,589 A | 12/1998 | Wilson et al. | ............... 367/157 |
| 5,877,826 A | 3/1999 | Yang et al. | .................... 349/36 |
| 6,369,868 B1 | * 4/2002 | Fan et al. | ...................... 349/88 |
| 2002/0030786 A1 | * 3/2002 | Stephenson | .................. 349/185 |
| 2002/0057400 A1 | * 5/2002 | Li et al. | ........................ 349/96 |

FOREIGN PATENT DOCUMENTS

| | | |
|---|---|---|
| WO | WO 97/16762 | 5/1997 |
| WO | WO 99/51266 | 10/1999 |

* cited by examiner

*Primary Examiner*—Robert H. Kim
*Assistant Examiner*—Jeanne A. Di Grazio
(74) *Attorney, Agent, or Firm*—Klauber & Jackson

(57) ABSTRACT

A device and method of manufacturing a single layer multi-state ultra-fast cholesteric liquid crystal includes two optically transparent states with a liquid crystal arranged therebetween, and changing the optical states of the liquid crystal ranging from one state to any combination of broadband reflection, tunable narrow band reflection, light scattering, and transparency in accordance with a voltage applied to the device. A surfactant can be added to reduce the response time and a dichroic dye may be added to include the property of light absorption and reduce the bandwidth. The device can provide any and all of the aforementioned optical states for infrared light, visible light, and ultra-violet light. The desired outputs can be formed according to need, so that predetermined optical states can operate with either no voltage or a particular voltage or voltage range.

170 Claims, 15 Drawing Sheets

SINGLE LAYER MULTI-STATE ULTRA-FAST CHOLESTERIC LIQUID CRYSTAL DEVICE AND THE FABRICATION METHODS THEREOF

This application claims priority from U.S. provisional application No. 60/236,992, filed Sep. 29, 2000.

BACKGROUND OF THE INVENTION

1. Field of the Invention

This invention relates cholesteric liquid crystal devices. More importantly, the present invention relates to a single layer multi-state ultra-fast cholesteric liquid crystal device for switching.

2. Description of the Related Art

An electro-opticallyactive cholesteric liquid crystal (CLC) known in the prior art can possibly exhibit some of the following optical states depending upon the external conditions:

(1) The CLC can be operated in a narrow band reflective state associated with the spontaneous planar alignment texture of the CLC molecules with a constant helical pitch as disclosed by, P. G. de Gennes and J. Prost, "The Physics of Liquid Crystals", (Oxford University Press, New York, 1993, $2^{nd}$ Edition); or (2) The CLC can be operated in a broadband reflective state associated with the disturbed planar alignment texture of the CLC molecules with a pitch gradient as disclosed by, "Single Layer Reflective Polarizers with Electrically Controlled Spectrum", Jianfeng Li, B. Fan, and Le Li, SID'97, 1999; or (3) The CLC can be operated in a focal conic state that optically scatters light in the visible region; or (4) The CLC can be operated in a homeotropic state that is optically transparent under an electric field.

Conventional CLCs, when in a planar alignment, adopt a spiral arrangement to form a uniform helical structure. They exhibit the property of selectively reflecting light at a pre-set wavelength $\lambda_0 = n_a P$ with a naturally narrow bandwidth $\Delta\lambda_i = \Delta n\,P$, where "P" is the helix pitch, and $\Delta n$ is the CLC birefringence. 50% of the unpolarized incident light within the band is reflected into a circular polarization state that has the same handedness as the CLC spiral, while the remaining 50% is transmitted with the opposite polarization state.

A broadband reflective CLC can be obtained via creating a pitch gradient $\Delta P$ along the to CLC helix. The resulted broad bandwidth is determined by $\Delta\lambda = n\,\Delta P$. The pitch gradient is created via liquid crystal molecular diffusion under a non-uniform UV field during the polymerization. Both passive and active broadband CLC reflecting films have been obtained. In one of the recent development as disclosed by, "Method of Manufacturing a Switchable Cholesteric Filter as well as a Luminaire Having such a Filter", R. A. M. Hikmet, PTC, July, 1997, a broadband, switchable CLC film is made from a cholesteric liquid crystal mixture containing a small amount of diacrylate, monoacrylate, non-active nematic liquid crystal, and a non-reactive chiral component. A photo stabilizer is a necessary component in creating such a broadband switchable film. The resulted film operates in the visible spectral region from 448 to 648 nm. No light scattering state has been observed. The switchable broadband CLC has a very high (close to 80%) transmittance when a sufficiently strong field is applied.

In another development, different techniques have been invented that create active broadband polarizers from a cholesteric liquid crystal blend that contains a polymerizable CLC compound and non-polymerizable nematic(s), plus a small amount of photo initiator. Two different polarizers have been developed. In the absence of an electric field, one type of polarizer exhibits a broadband polarizing reflective state in the visible region while the second type polarizer exhibits a narrow band (70 nm) polarizing reflective state in the red spectral region. The first type polarizer can be switched to transmissive state by an AC field; while the second type polarizer is switched from narrow band to broadband reflections by applying a DC voltage.

The broad bandwidth of the first type of polarizer is created by UV induced liquid crystal diffusion mechanism while the bandwidth broadening of the second polarizer is primarily due to the molecular re-orientation of LCs and the subsequent pitch change by the electric field. The first type polarizer is fabricated using a weaker UV light exposure which creates a nonlinear helical pitch distribution along the CLC helical axis. In the absence of an electric field, the reflection band from 440 nm to 660 nm with an average reflectivity around 45% was obtained. Switching of the first type polarizer is realized via vertically re-orienting the CLC molecules by an electric field. Upon applying an AC electric field (10 V/$\mu$m), the average reflectivity drops to 2% with a residual reflection peak left near 440 nm which is believed due to the CLC polymer network.

The second type of polarizer is created by a strong UV source (1 W/cm$^2$) and a higher concentration of photo-initiator. As a result, diffusion was restricted during the polymerization, creating a much more uniform helical pitch distribution throughout the mixture and resulting in a spontaneously narrow bandwidth reflective polarizer. In the presence of a DC electric field of 7 V/$\mu$m, the polymer network with its own helical structure was not affected due to its high cross-linking density. However, the electric field tends to untwist the non-cross-linked CLC components. Due to the surface constraints and the nature of the cross-linked cholesteric polymer, below the threshold field the non-cross-linked molecules close to the polymer network maintain their orientations, while those further away are aligned along the field. The result is a deformed spiral with a slight mis-orientation that contributes to band broadening.

CLC can also exhibit a focal conic state that scatters light, as shown in FIG. 1. The focal conic state can be generated via different ways. The most conventional method is to electrically trigger a CLC already in a planar state (associated with a naturally narrow band polarizing state) into the focal conic state. In General, such a focal conic state is unstable.

The focal conic state can be stabilized via different methods. The first method involves introduction of a polymer gel network, which is termed as polymer stabilized cholesteric texture (PSCT) as disclosed by, D. K. Yang, L. C. Chien and J. W. Doane, "Cholesteric liquid crystal/polymer gel dispersion for haze-free light shutter,"*Appl. Phys. Lett.*, 60, 3102–31104 (1992). Two different operating modes can be realized, i.e., the normal mode and reverse moderespectively.

In the absence of an electric field, the normal mode PSCT is in its focal conic state. Applying a sufficient electric field, the CLC molecules are aligned into the homeotropic state which is optically transparent. In this mode, the CLC does not show a planar state during the switching. In a reverse mode PSCT, initially it is in the planar state, characterized by a naturally narrow band reflecting state usually in the IR region. When a suitable electric pulse is applied, the CLC is triggered into a stable focal conic state, which can be triggered back to the original planar state by another electric pulse. In this operating mode, the CLC is switched between the narrow band reflecting state and focal conic state. It does not have a broadband reflection state.

In addition, the switching speed of most prior-art CLC device is relatively slow, in the range of tens or hundreds of milliseconds. There is one prior-art technology in which the switching speed of a surface stabilized cholesteric texture (SSCT) device has been reduced to 150 microseconds typically, or even as low as 10 microseconds, as disclosed by "*Ultra Fast Response, Multistable Reflective Cholesteric Liquid Crystal Displays*", Bao-Gang Wu, Hongxi Zhou, Yao-Dong Ma, U.S. Pat. No. 5,661,533, 1997, by doping non-ionic surfactants. The function of these surfactants is to isolate the CLC domains from each other while simultaneously reduce the friction forces between the domains and between domains and boundary surface.

Moreover, the surfactant additives produce more uniform distribution of domain size. The net effect of the surfactant additives is to allow continuation of a structure in which the orientation of each microsized liquid crystal domain is stable under zero field, but is much freer to response to a perturbation such as an electric field.

In short, the surfactant functions as a lubricant between the liquid crystal domains and between the domains and the boundaries. The neutral non-ionic surfactant is preferred with a Hydrophile Lipophile Balance (HLB) value ranging from 2.9 to 19. The surfactant can range from 0.1% to 10% of the total weight of the cholesteric liquid crystal mixture. Several surfactants have been found to be effective in reducing the CLC response time. These surfactants are PEG 400 monostearate (HLB=11.6), PEG 1540 monostearate (HLB=17.3), PEG 4000 monostearate (HLB=18.6), Sorbitan monoleate (HLB=15), and Sorbitan monoleate (HLB=10) (all from Chem Service Inc., Westchester, Pa.). Adding a few percent of one of these surfactants into a normal CLC mixture with a pitch in the visible region, the electro-response time has been dramatically reduced from 150 millisecond to 150 microsecond or even 10 microsecond.

Conventional CLC can be light absorptive, in addition to the light scattering, reflection, and transparent states, if a dichroic dye is introduced. Dichroic dye has an elongated molecular shape. It absorbs the light whose electric vibration is along the longer dye axis and passes the light whose electric vibration is perpendicular to the longer axis. The dye can be narrow band absorptive so that it appears to be colorful. Or, the dye can be broadband absorptive so that it looks like a black ink.

Dichroic dye has been added into conventional narrow band CLC and PSCT. In the former case, the dye can have absorption at the same or different wavelength of the CLC reflection peak. In the later case when the PSCT is in the normal mode, the dyed CLC device exhibits a mixed light scattering and absorption state when the CLC is in the focal conic state. When the CLC is switched into the homeotropic state, the device becomes transparent. If the CLC is in reverse mode, in the absence of an electric field, the device exhibits a mixed state of absorption and narrow band reflection. When an electric field is applied or the device is triggered into the focal conic state, the device exhibits a mixed state of light scattering and absorption.

In summary, conventional CLC devices can only achieve the following performance characteristics.

1. An electro-optically-active CLC device that can be switched among a narrow band polarizing state, focal conic light scattering state, and transparent state.

2. An electro-optically-active CLC device that exhibits bi-stable states of a slightly focal conic and distorted planar state. Such a device can be made from either polymer stabilized cholesteric texture (PSCT) or surface stabilized cholesteric texture (SSCT).

3. An electro-optically-active CLC device that can be switched between a focal conic state and a homeotropic state.

4. An electro-optically-active CLC device that can be switched between a broadband reflective polarizing state and a narrow band reflective polarizing state.

5. An electro-optically-active CLC device that can be switched between a broadband reflective polarizing state and a transparent state.

6. An electro-optically-active CLC device that can be switched between a transparent state and a mixed state of light scattering and absorption.

7. An electro-optically-active CLC device that can be switched between a mixed state of light absorption and narrow band reflection and another mixed state of light scattering and light absorption.

However, there does not exist a CLC device that, in a single layer structure, can exhibit the following optical states and can be switched among them: (1) electrically tunable narrow band reflective state, (2) broadband reflective state, (3) light scattering state, (4) transparent state, and, possibly, (5) light absorption state. The technology disclosed in this document can achieve such a high performance liquid crystal and related device(s).

SUMMARY OF THE INVENTION

Accordingly, the present invention provides a cholesteric crystal which can be electrically switched and/or tuned to exhibit a single or a combination of the following optical states: (1) light scattering state, (2) transparent state, (3) narrow band circular reflection, (4) broadband circular reflection state, and (5) light absorbing state. Moreover, the single layer devices of the invention are noteworthy in that they are comprised of polymer gels or networks that exhibit multiple optical states, which have been successfully doped with surfactant to achieve improved switching speed.

This technology has been introduced into the currently described liquid crystal material that contains polymer network that exhibits the multiple optical states. Its effectiveness on reducing the response time has been demonstrated. Therefore, it is the second objective of this invention to adopt this technique to reduce the response time of the multi-state cholesteric liquid crystal device.

In one embodiment of the present invention, the device can be electrically switched to one of the following optical states: (1) broadband circular reflection state, (2) light scattering state, (3) narrow band circular reflection, and (4) transparent state.

In another embodiment of the present invention, the device can be switched to one of the following optical states: (1) Broadband reflective state mixed with light scattering state, (2) narrow band reflective, and (3) transparent state.

BRIEF DESCRIPTION OF THE DRAWINGS

FIG. 15a illustrates an optical pulse signal from the polarizer with the surfactant, while

DETAILED DESCRIPTION OF THE PREFERRED EMBODIMENTS

Illustrative embodiments and exemplary applications will now be described with reference to the accompanying drawings to disclose the advantageous teachings of the present invention. It is understood by persons of ordinary skill in the art that the illustrative embodiments are presented for purposes of illustration and not for limitation, and that an artisan understands that there can be variations of the embodiments which are within the spirit of the invention and the scope of the appended claims.

Figure 1:
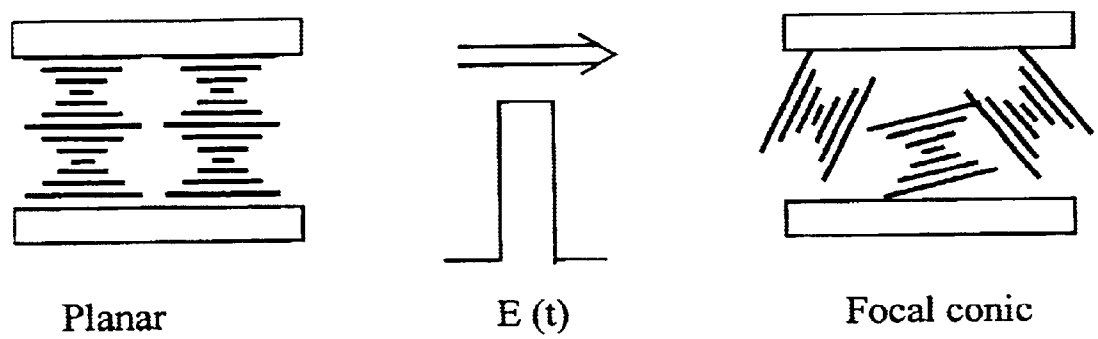
FIG. 1 illustrates triggering of a CLC in planar state to a focal conic state by an electric field.
Figure 2:
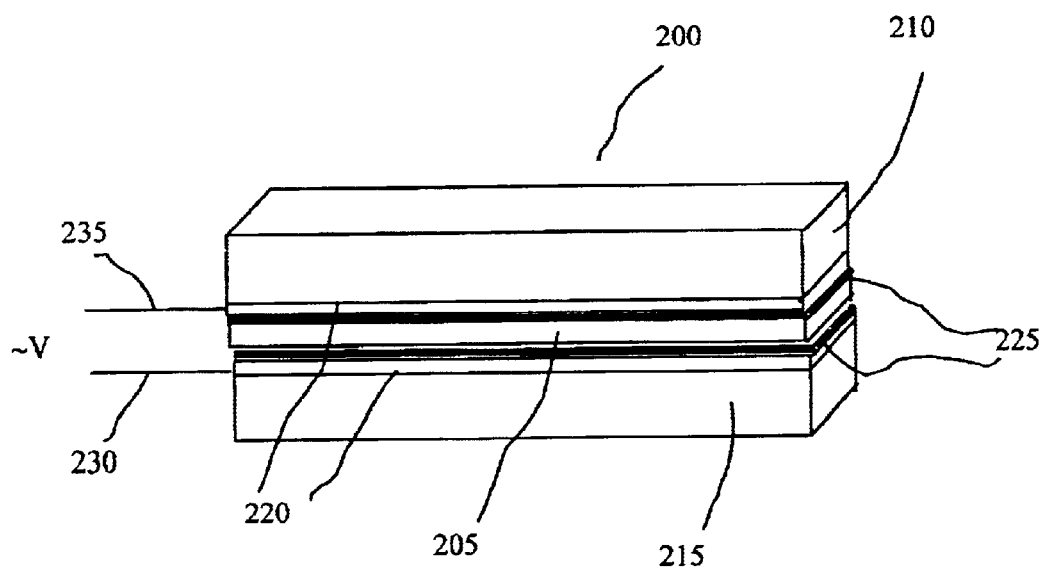
FIG. 2 is a schematic illustration of the invented CLC device structure.

FIG. 2 is a schematic drawing of a first embodiment of the CLC device 200 according to the present invention, in which no dichroic dye is introduced. In this device, the liquid crystal 205 is sandwiched between two optically transparent substrates 210, 215 that have an Indium-Tin-Oxide (ITO) electrode 220 and a rubbed polyimide coating 225. The switching of the device is realized via applying an electric voltage "V" to the two ITO electrodes 230, 235.

FIG. 3 schematically illustrates the optical states of the embodiment of the CLC device of the present invention shown in FIG. 2 and their associated liquid crystal alignment texture.

Figure 3A:
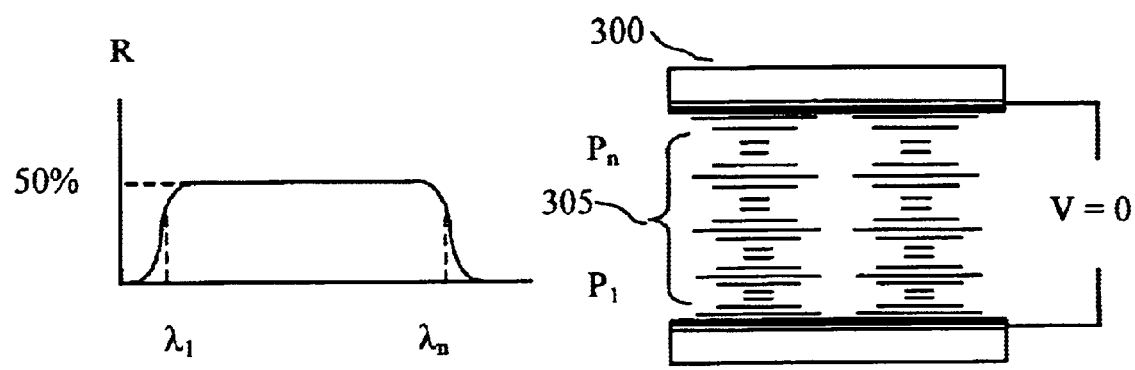
FIGS. 3*a* to 3*e* provide schematic illustrations of the four optical states of the invented CLC device and their associated CLC alignment texture in one of the embodiments.

As shown in FIG. 3(a), the first optical state of the CLC 300 is aligned in a planar texture 305 with a pitch gradient under zero voltage (V=0). In this optical state, the device reflects a broad band-pass of an unpolarized incident light into a circularly polarized light whose handedness matches that of the CLC helix. 50% of the light within the bandwidth is reflected while the rest 50% is transmitted as an opposite polarization.

Figure 3B:
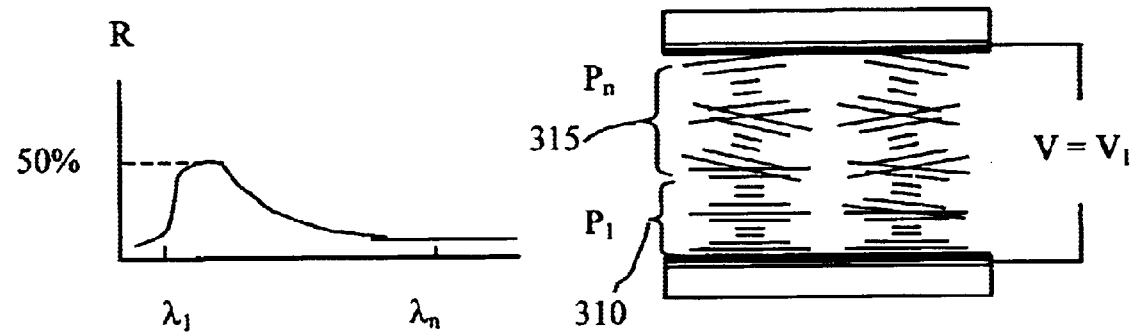

FIG. 3b illustrates the second optical state of the first embodiment when a non-zero voltage ($V=V_1 \neq 0$) is applied. In this state, part of the CLC is aligned in a planar texture 310 with a pitch gradient $P_1$, while the rest CLC is switched into the focal conic state 315. In this optical state, the device exhibits a distorted broadband reflection characteristic, as shown by the adjacent graph. At the same time, a focal conic texture is presented, therefore the device becomes scattering in the visible light range. Depending on from which side the light is incident, the device results in different transmission and reflection characteristics. If the light is incident from the planar alignment texture side 310, close to 50% of the light within the distorted bandwidth is reflected. The rest of the light is transmitted and scattered. Due to the nature of light scattering, the polarization of the transmitted light is disturbed and scrambled.

However, if the light is incident from the focal conic texture side 315 of the device, first of all, the light experiences a light scattering process in both forward and backward directions. Less than 50% of the forward-scattered light within the distorted bandwidth is reflected by the next CLC in planar texture followed by a second time scattering when re-passing through the focal conic layer. Therefore, the polarization state of the reflected light is disturbed and scrambled. The rest of the forward scattered light is transmitted through the planar CLC with opposite polarization to the CLC helix handedness. Actually, the transmitted light is partially depolarized because some of the light hitting the planar CLC at a large angle is difficult to be completely polarized.

Figure 3C:
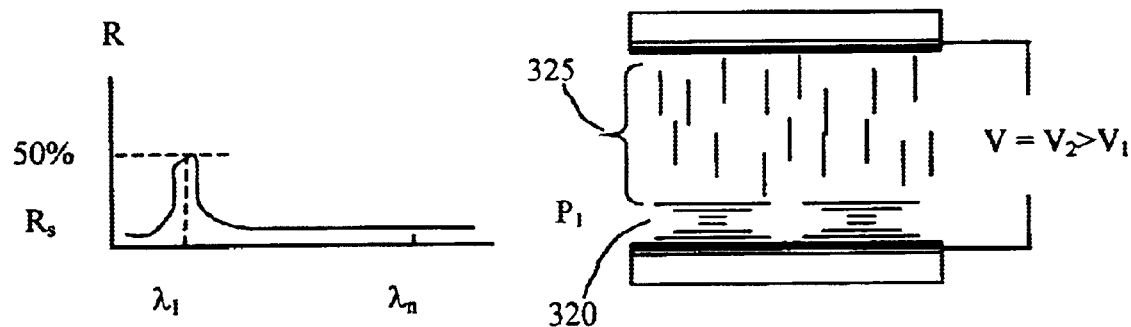

FIG. 3c illustrates the third optical state of the first embodiment when a higher voltage ($V_2 > V_1 \neq 0$) is applied. In this state, part of the CLC 320 is still aligned in a planar texture with a quasi-constant pitch. The rest CLC 325 is vertically aligned by the electric field into the homeotropic texture. In this optical state, the device exhibits a quasi-narrow band reflection characteristic at the wavelength determined by the quasi-constant CLC pitch.

Figure 3D:
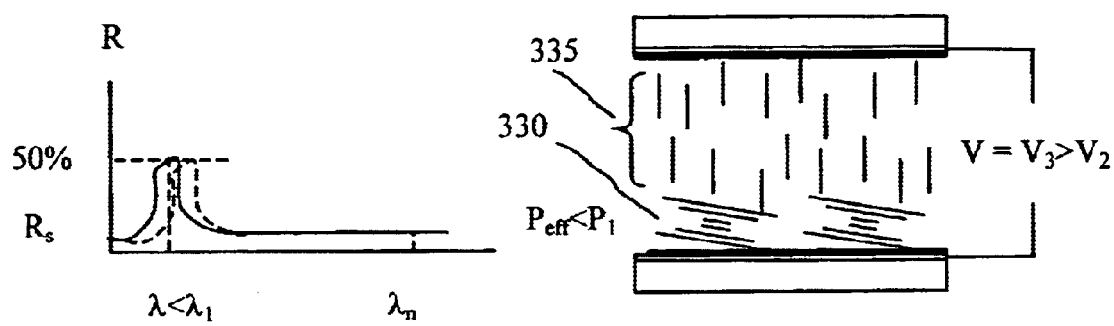

FIG. 3d illustrates the device still in the third optical state of the first embodiment but showing a wavelength shift when an even higher voltage ($V_3 > V_2$) is applied. In this state, part of the CLC 330 remains in a planar texture with a quasi-constant pitch. However, this CLC pitch is tilted by the electric field. The rest of CLC 335 is still aligned in the homeotropic texture. In this optical state, even though the device still exhibits a quasi-narrow band reflection characteristic, its wavelength has a blue shift. This particular situation implies that the reflection wavelength of the invented CLC device is electrically tuned while its bandwidth does not experience a noticeable change.

Figure 3E:
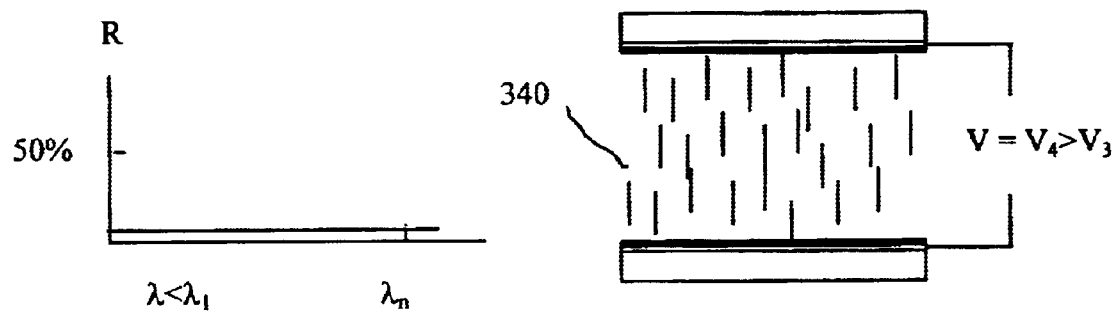

FIG. 3e illustrates the fourth optical state of the first embodiment under a very high voltage ($V_4 > V_3$). In this state, all the CLC helices 340 are completely unwound and the whole CLC is vertically aligned into the homeotropic texture. Therefore, the device becomes optically transparent.

FIGS. 4a–4d schematically illustrate the optical states of the invented CLC device in the second embodiment of the present invention, and their associated liquid crystal alignment texture.

Figure 4A:
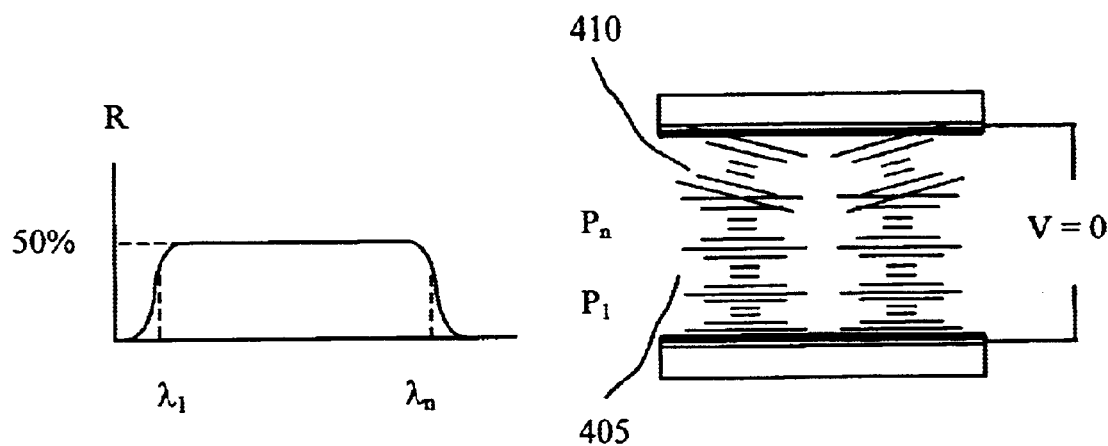
FIGS. 4a to 4d are schematic illustrations of the three optical states of the invented CLC device in the second embodiment.

FIG. 4a illustrates the first optical state of the second embodiment in which part of the CLC is aligned in a planar texture with a pitch gradient under a zero voltage (V=0). The rest CLC is in the focal conic texture 410. In this optical state, the device exhibits a mixed optical state of reflection and scattering, which is similar to the optical texture in FIG. 3b.

Figure 4B:
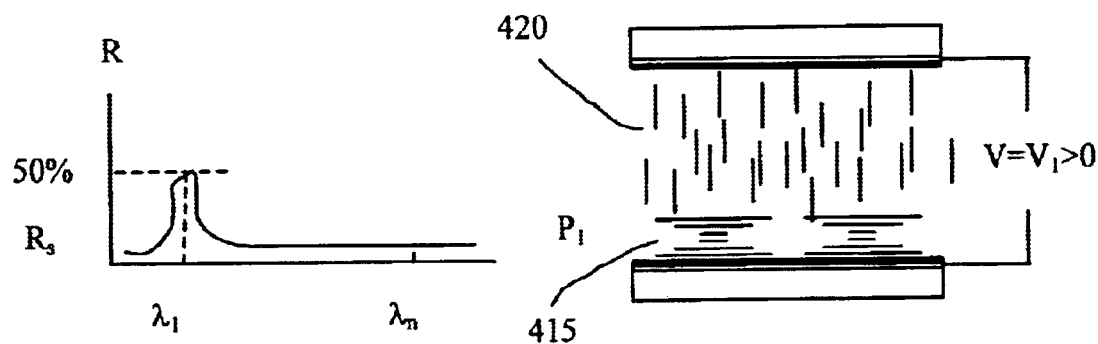

FIG. 4b illustrates the second optical state of the second embodiment when a non-zero voltage ($V_1 \neq 0$) is applied. In this state, part of the CLC 415 is aligned in a planar texture with a quasi-constant pitch while the rest CLC 420 is aligned into the homeotropic texture. In this optical state, the device exhibits a quasi-narrow band reflection characteristic at the wavelength determined by the quasi-constant CLC pitch.

Figure 4C:
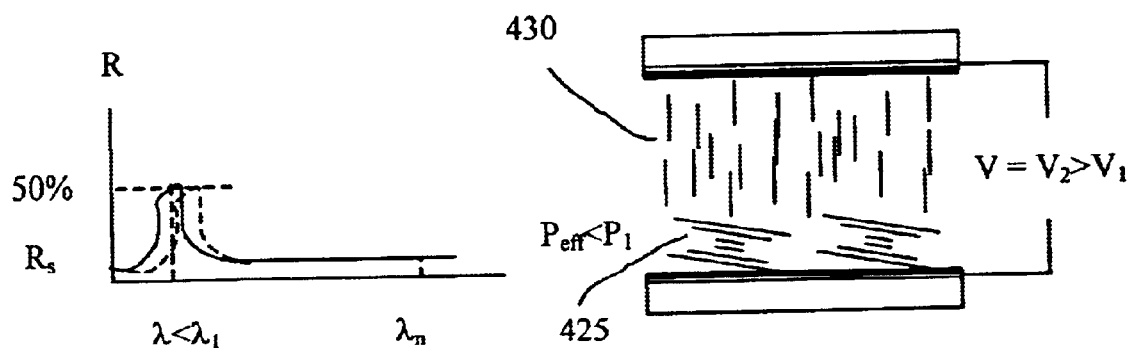

FIG. 4c illustrates the narrow band reflection but at a shifted wavelength when a higher voltage ($V_2 > V_1$) is applied. In this state, part of the CLC 425 remains in the planar texture with a quasi-constant pitch. However, this CLC pitch is tilted by the electric field. The rest of CLC 430 is still aligned in the homeotropic texture. The reflection wavelength of the invented CLC device is electrically tuned while its bandwidth does not experience a noticeable change.

Figure 4D:
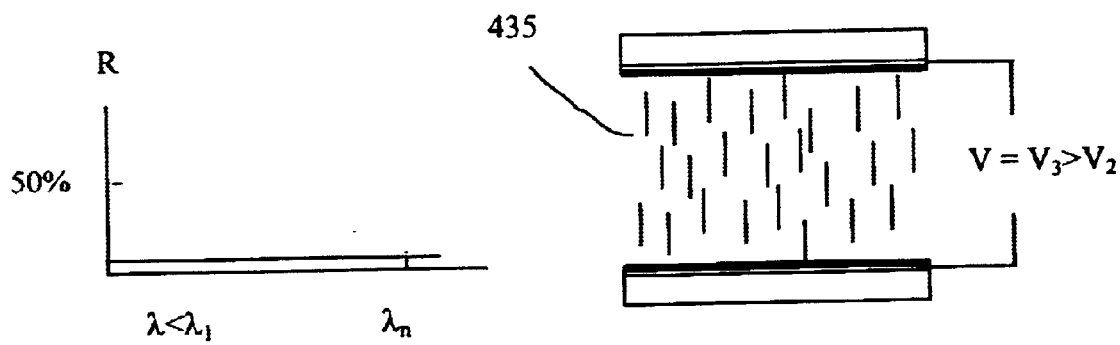

FIG. 4d illustrates the third optical state of the second embodiment under a very high voltage ($V_3 > V_2$). In this state, all the CLC helices 435 are completely unwound and the whole CLC is aligned in the homeotropic texture. The device becomes optically transparent.

Therefore, according to the present invention, a light scattering layer is created from a CLC material that exhibits broadband reflection. This can be realized by suitably controlling the polymer network. If the CLC polymer network is too tight, the focal conic state is difficult to be created. On the other hand, however, a "tight" enough polymer network must be presented to maintain the CLC pitch gradient for reflecting broadband polarized light.

It is preferable to create a CLC panel that has low enough polymer concentration at one side for the focal conic state and, on the other hand, has tight enough polymer net work at the other side to maintain the pitch gradient, (with reference to FIG. 3 and FIG. 4).

Such a polymer distribution can be created via a mechanism called UV polymerization induced molecular re-distribution mechanism. The CLC composite material contains LMW liquid crystal and liquid crystal polymer. When subject to UV for polymerization, the UV has an intensity gradient along its propagation direction across the device thickness. During the polymerization process, the LMW LC is phase separated from the CLC polymer network and diffuses along the UV light. In some particular material mixtures, the LMW LC diffuses toward to the UV intensity strong sites while in other material mixtures the LMW LC diffuses toward to the opposite direction.

As a result, a polymer concentration gradient is created from one side to another across the thickness. In order to have a suitable polymer concentration favorable to the focal conic state in the polymer depleted area, the following two methods can be used, i.e., (1) making the device thick enough, and/or (2) using less polymer. The larger thickness provides with enough space where the liquid crystal polymer can be depleted to the desired degree to create a less enough polymer zone. The second condition, i.e., less polymer concentration, further helps to create a less polymer concentration zone favorable for the focal conic state.

Figure 5A:
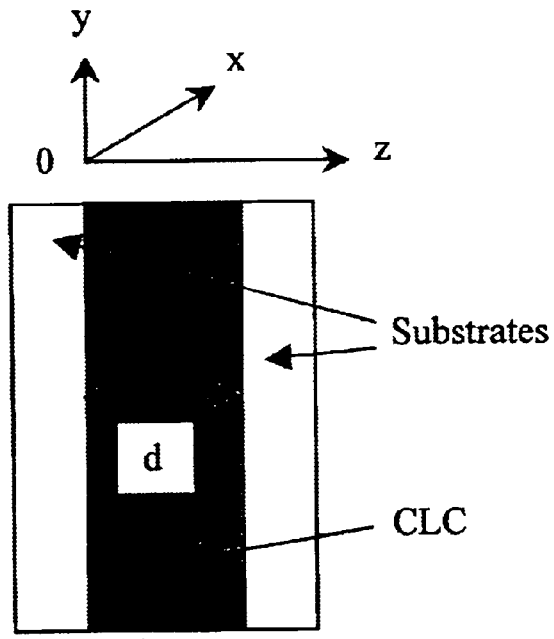
FIGS. 5a and 5b provide schematic illustrations of a preferred CLC pitch distribution that is favorable for creating the focal conic state.
Figure 5B:
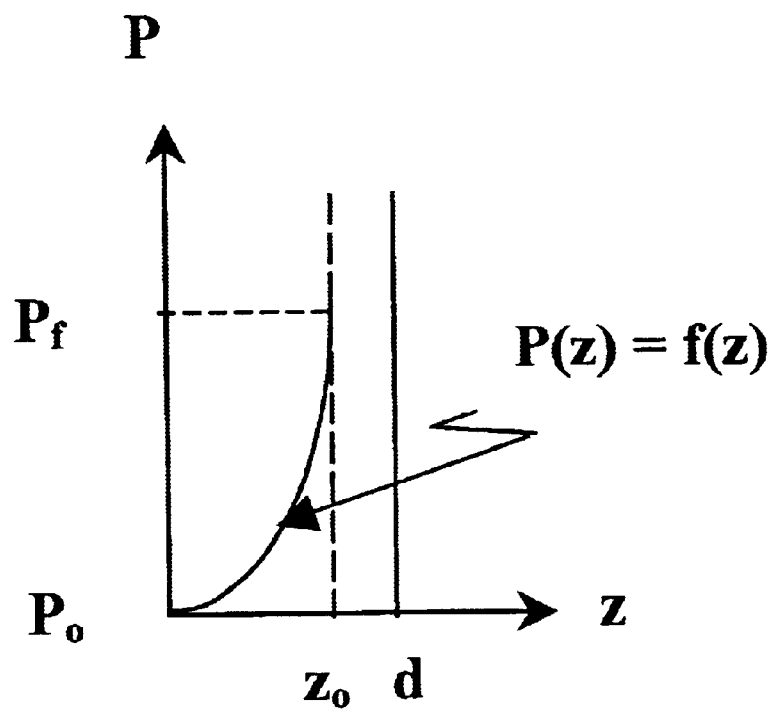

FIG. 5 schematically illustrates the desired CLC pitch distribution across the device thickness, which is favorable for creating the light scattering from the CLC material that has pitch gradient. The CLC has a thickness of "d". It has a non-constant pitch distribution $P(z) = f(z)$ from $z=0$ to $z = z_0 < d$, where the origin "0" is located at one of the CLC sides. Beyond $z_0$, the CLC, containing the polymer network, could adopt either a planar alignment with a constant pitch or a focal conic texture which is light scattering.

The final CLC alignment texture within the region $z_0 < z < d$ depends on the surface anchoring strength of the alignment layer, for example, a rubbed polyimide. If the surface anchoring is strong, the CLC tends to have a planar texture. If the anchoring is weak, the CLC could be in the focal conic texture. The weak surface anchoring can originate from weak rubbing strength on the polyimide. Therefore, due to the liquid crystal phase separation and diffusion that disturbs the CLC alignment texture during the UV polymerization, the CLC near the weak alignment side could result in the focal conic texture.

Creating a light scattering state from a broadband CLC material has many possible applications. For example, a CLC panel according to the present invention can be used to construct a unique glazing. Assume the glazing is built with the CLC panels illustrated either in FIG. 3 or FIG. 4, where the broadband CLC reflects in the near Infrared which corresponds to the solar IR from 800 nm to 1,200 nm. This glazing will show light scattering state as well as broadband reflection. If the reflection and the scattering states exist at the same time, then this glazing provides with privacy (due to scattering) as well as IR rejection (due to the IR reflection), which is important if the glazing is used in the cooling dominant environment such as in summer time. As a result, the air conditioning costs are reduced. Applying a voltage could remove the scattering state so that the same glazing becomes transparent yet it still reflects in the IR.

Furthermore, if the voltage is high enough, the glazing becomes totally transparent in both visible and IR so that all the light components including the IR will pass through. This is desirable if heating of the interior is needed to reduce the heating cost.

In addition, if the CLC panels were installed, for example, in the windows of a vehicle, there can be an activation of the blocking mechanism when the car is parked so that the vehicle compartment does not reach the nearly 190 degree Fahrenheit temperatures that the interior of cars can reach when parked in the sun with the windows closed. This will not only preserve certain types of interiors (such as leather or vinyl) from cracking, and the inconvenience of getting into a hot vehicle with seats that feel to the skin as almost burning, but also for safety reasons as well. While not encouraging that pets and/or children should ever be left in vehicles unattended, an artisan understand that a vehicle battery or alternative power source can activate the panels after a certain temperature inside the car is reached, as a safety precaution. The could also be a tremendous fuel savings and reduced pollution as people often idle cars with the engine running for prolonged periods while a passenger exits the car to keep the car cool.

Another of the many uses for this invention is that under a suitable voltage, the reflection wavelength of the device is shifted by changing the voltage while its bandwidth is not changed.

A third embodiment of this invention is the introduction of a dichroic dye into the CLC material such that the resulted device will exhibit a light absorption state, in addition to the previously mentioned four optical states. A dichroic dye consists of elongated molecules that absorb light polarized along the longer axis while pass light polarized perpendicular to the longer axis. When the dye is mixed and aligned well with the CLC molecules, the dye molecules follow the CLC helical structure.

Dichroic dye helps to enhance the device "ON" and "OFF" contrast ratio in transmission. When a light passes through the dichroic dye doped CLC that is aligned in planer texture, it experiences a two-fold attenuation, i.e., the reflection by the CLC helix and the absorption by the dye if the dye absorbs at the same CLC reflection wavelength. If the dyed CLC is switched into focal conic state, it scatters as well as absorbs light.

Finally, once the CLC and dye are switched into the homeotropic texture, the dyed CLC becomes transparent because under this situation the dye molecules do not absorb light. Since the transmittance in both planar and focal conic texture is significantly lowered due to the dye absorption and the clear state transmittance is not affected significantly, the net result is an increase of the transmission contrast ratio which is defined as the ratio of the clear state transmittance to that in the reflection/absorption state or scattering/absorption state.

For all of the above embodiments, a crosslinkable liquid crystal liquid crystal(s) provides the best mode for building the multi-state CLC device. It has been proven that, regardless of the final handedness of the multi-state CLC device, the crosslinkable liquid crystal can be either nematic liquid crystal, or left-handed cholesteric liquid crystal, or right-handed cholesteric liquid crystal. The crosslinkable liquid crystal can be photo polymerized under either ultra violate (UV) light or visible light, depending on the type of the photo initiator used in the system. If the photo initiator works in UV region, UV light is needed. On the other hand, if the photo initiator works in the visible region, visible light is used for polymerization.

The fourth embodiment of this invention is reducing the device response time. The electro-optical response speed of this kind of CLC device is slow. In order to reduce the response time, the similar concept developed by Wu et al is adopted. Although in Wu's work, the fast response was achieved from a CLC without polymer gel, it is believed that, even in the presence of a polymer network, the same mechanism should hold to reduce the friction between the CLC domains, between CLC domains and boundaries, and more importantly, between CLC domains and polymer network. As a result, the response time of this CLC system is expectedly reduced.

In an experiment, the new device was fabricated using the following method. First, prepare the liquid crystal mixture containing crosslinkable CLC, low-molecular-weight (LMW) nematic liquid crystal, chiral additive, and photo initiator. The mixture is then filled into a glass cell with ITO and rubbed polyimide coating. Finally, the device is subject to UV at room temperature for photo polymerization.

The following examples are illustrated in order to prove the validity of the spirit in this invention and show the advantages thereof heretofore unknown in the prior art.

EXAMPLE 1

Figure 6:
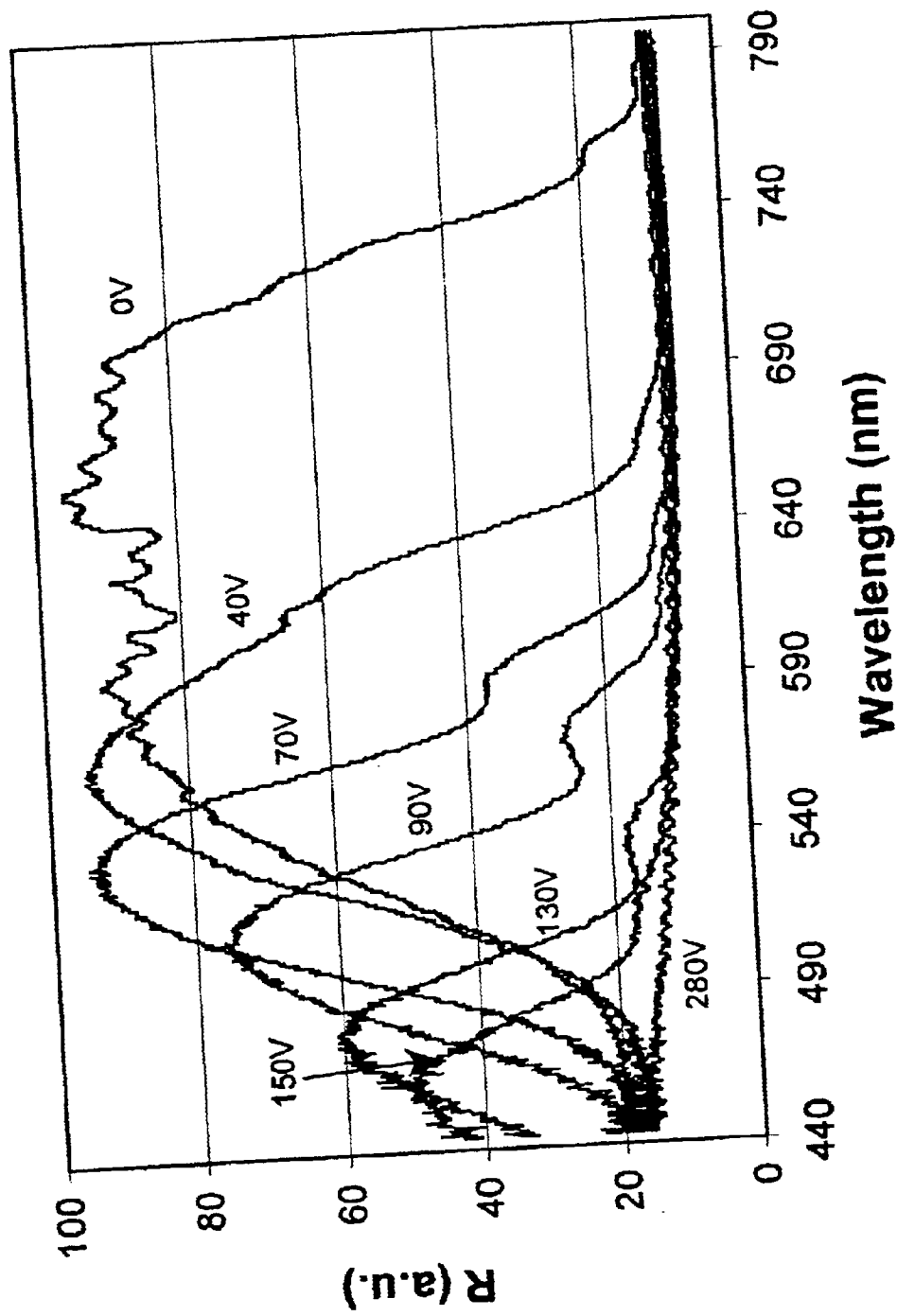
FIG. 6 illustrates a reflection spectrum of the polarizer.

This example corresponds to the first embodiment. Material recipe: CLC polymer less than 10%=7.3%, nematic= 62.9%, chiral in the rage between 25 to 35%=29.6%, and small amount of photo initiator. The rest is nematic liquid crystal. Sample thickness d=15 μm. The resulted device has a right-handed helix. Its spectrum was then measured on a spectrophotometer. FIG. 6 shows a typical reflection spectra under different voltage.

Under zero voltage, the polarizer spontaneously covers a broad spectral band from 510–670 nm, which corresponds to the situation shown in FIG. 3(a). Upon applying an electric field, the polarizer experiences a bandwidth shrink starting from the longer wavelength side until V=85V, where the polarizer exhibits a narrow band reflection around 515 nm. If the voltage is further increased, the bandwidth does not change. However, its center wavelength has a blue shift to 470 nm. If the voltage reaches 288V, no reflection is observed from the CLC.

A careful investigation reveals that the narrow band reflection is related to the intrinsic reflection by the cholesteric liquid crystal polymer used in the mixture. The CLC polymer itself has an intrinsic reflection at 500 nm. When the voltage across the broadband polarizer reaches to certain level, all the low molecular weight (LMW) liquid crystals are vertically aligned except the cross-linked CLC's at the sites where its density is high enough. This corresponds to the situation illustrated in FIG. 3(c). These unwinded CLC's has a quasi-constant pitch distribution with a pitch close to that of the original CLC polymer, i.e., 500 nm. Therefore a narrow band reflection is first observed around that wavelength. It should be pointed out that this narrow band reflection does not necessarily have to have exactly the same wavelength as the original CLC polymer.

Generally, such a narrow band reflection may take place at a longer wavelength than the original CLC polymer due to the fact that the CLC polymer network may contain certain amount of LMW liquid crystal molecules which are in nematic phase (does not have twisting power). Actually, this is exactly the situation which has been observed in this example.

Further increasing the voltage can not completely unwind the CLC polymer helix if the polymer concentration is high enough. Instead, a tilted helix is observed, which results in a blue shift of the CLC reflection to 485 nm. This corresponds to the situation illustrated in FIG. 3(d). Finally, if the voltage is further increased to 280V, all the CLC helices are unwinded. As a result, the device becomes transparent.

Figure 7A:
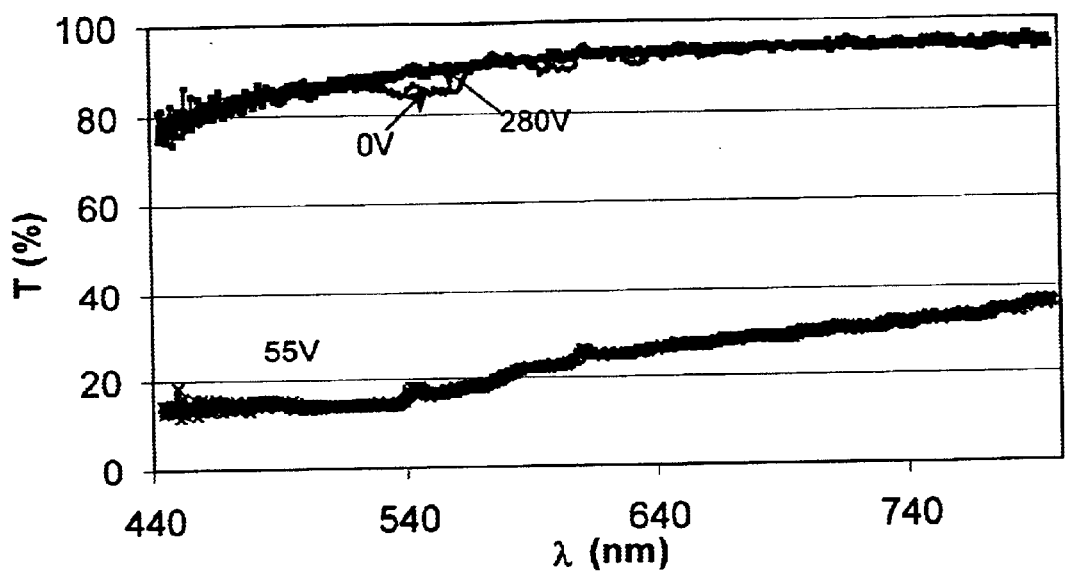
FIGS. 7a and 7b illustrate transmission spectra as a function of applied voltage measured with left-handed (a) and right-handed (b) circular polarization, respectively.
Figure 7B:
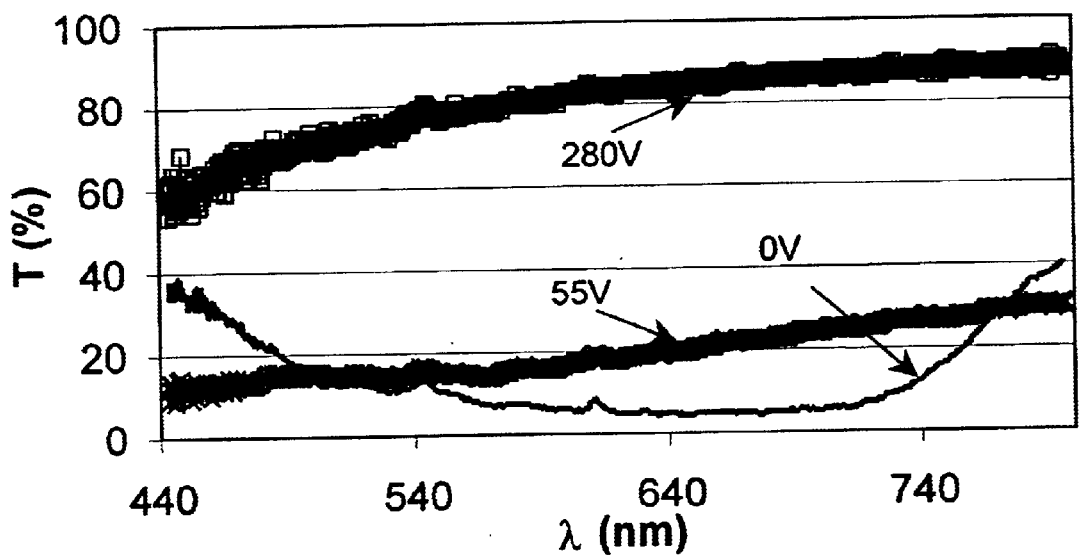

Since the measuring beam is incident onto the device side where the CLC is in the planar texture, the induction of the focal conic state by the electric field has not been shown in the reflection spectra. In order to verify the appearance of the focal conic state, the transmission spectra of the same device were taken. FIG. 7 shows the results measured with left- and right-handed incident polarization, respective, at different voltages.

It is seen that when the device was measured with a left-handed light, it shows a very high transmittance either when no (V=0) or very high (V=280V) voltage is applied. Under zero voltage, since the CLC is right-handed and in a very good planar alignment texture, it passes almost all the left-handed incident. On the other hand, when a very high voltage is applied, all the CLC molecules are vertically aligned into a homeotropic state. The device becomes optically transparent. However, under an intermediate voltage, i.e., V=55V, the transmittance drops dramatically, which is attributed to the scattering loss associated with the presence of the focal conic texture inside the CLC.

EXAMPLE 2

This example illustrates how the CLC pitch is distributed inside the new CLC material. A computer simulation program has been employed to study the CLC material composition and pitch distribution inside the new switchable multiple optical state CLC polarizer. The Berremann 4×4 matrix method has been modified to take into account of the material and pitch variation across the device thickness.

Figure 8:
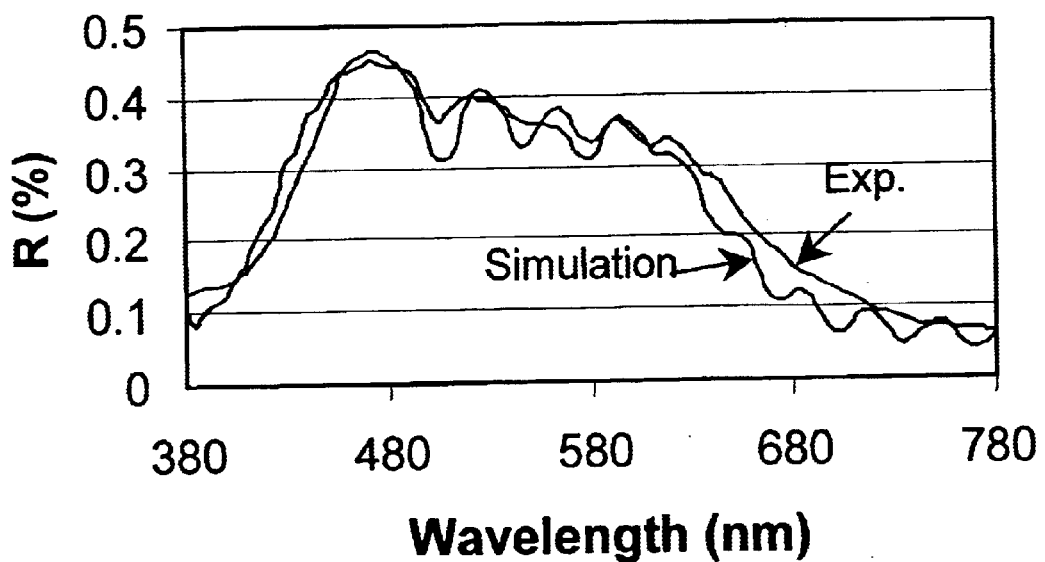
FIG. 8 illustrates a computer simulation of the switchable multiple optical state CLC device.

In the simulation, both transmission and reflection spectra at different angles have been calculated and compared with the experimental measurement to determine the pitch distribution. For a typical 8 μm CLC polarizer made from the material recipe of CLC polymer in the range between 10–15%%, nematic around 70%, and chiral around 30% with small amount photo initiator, FIG. 8 shows the computer fitted reflection spectrum which agrees well with the measured reflection spectrum of the CLC polarizer.

The simulation results indicate that both birefringence and CLC pitch inside this CLC polarizer have a linear distribution across the polarizer thickness. However, different from the prior art, such a variation exists only within a zone from $z=0$ to $z=5$ μm across the device thickness, i.e., the variation of the liquid crystal mixture birefringence is $\Delta n(z)=[\Delta n_1 - (\Delta n_1 - \Delta n_2)/5.05 \cdot z]$ for $0<z$ (in "μm")$<5.05$ μm where $\Delta n_1 = 0.18$, $\Delta n_2 = 0.10$. The origin of the "z" coordinate is defined at the surface that faces to the UV light during polymerization. The pitch distribution is $P(z)=P_1+(P_2-P_1)/5.05 \cdot z$ with $P_1=(425/n)=266$ nm; $P_2=(650/n)=406$ nm, and $0<z<5.05$ μm. It should be pointed out that the upper value of the "z" coordinate is only 5.05 μm, rather than the film physical thickness of 8 μm. This result means that the CLC has a pitch distribution zone only from $z=0$ to $z=5.05$ μm, beyond which the CLC has a constant pitch distribution since the sample does not exhibit light scattering in the absence of an electric field. The existence of such a constant pitch zone could be important for generating the CLC focal conic state.

EXAMPLE 3

This example also corresponds to the first embodiment except that the device is cured under a visible light in which a visible photo initiator is used. Material recipe: CLC polymer in the range between 10–15%, nematic in the range between 45–65%=59.5%, chiral between=15–30%%, visible photo initiator=1.5%. The sample thickness d=15 μm.

The sample was cured under a visible white light bulb at room temperature. The resulted device has a right-handed helix. Its spectrum was then measured on a spectrophotometer.

Under zero voltage, the device exhibits a broadband reflection from 500 to 780 nm. However, under a sufficiently high voltage, light scattering appears. Further increasing the voltage causes the reflection bandwidth dramatically decreased.

EXAMPLE 4

This example corresponds to the second embodiment. The device is made from the following recipe CLC polymer less than 10%7.3%, nematic from 55–65%, chiral=25 to 35%, photo initiator less than 1%. The device thickness d=15 μm. Curing temperature: room-temperature. The polyimide layer on one of the substrates was weakly rubbed to create a weak surface anchoring.

Figure 9:
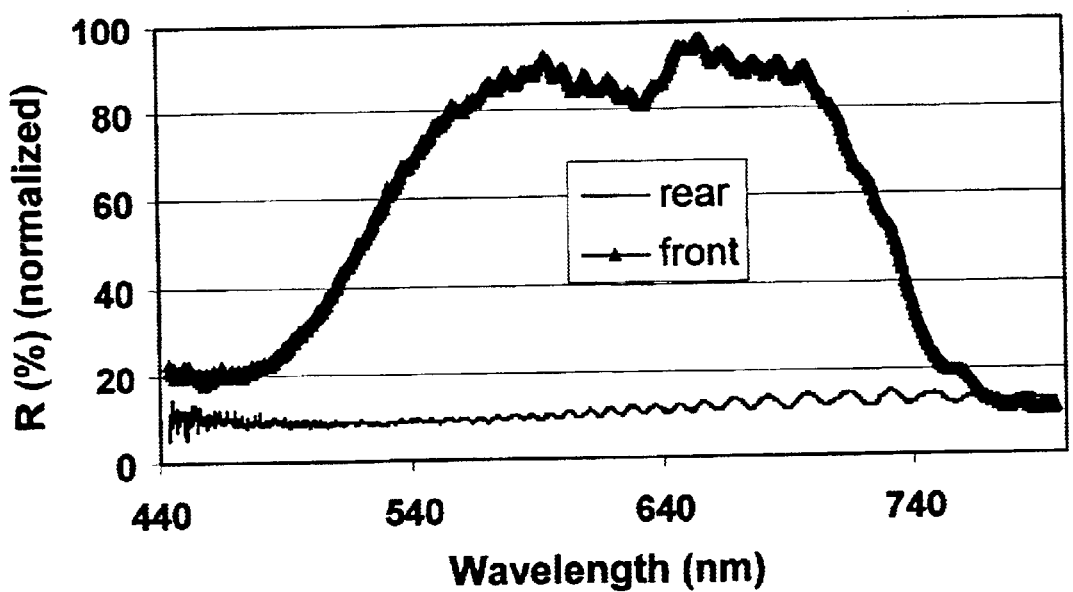
FIG. 9 illustrates reflection spectra from front and rear surface of the polarizer. The lower reflectivity from the rear surface implies a strong light scattering.

After curing, this device shows a strong light scattering effect at the weakly rubbed surface which was faced down during UV polymerization. However, the other side of the device does not exhibit the light scattering since a normal rubbing was applied. Instead, it shows a very high reflection of right-handedness due to the planar texture. Such a difference in the reflection is shown in FIG. 9, where the lower reflectivity was measured from the light scattering side.

Similar to the above examples, the bandwidth of this sample shrinks versus applied voltage. In addition, when the voltage reaches to certain level, a narrow band reflection peak appears. The reflection peak was shifted to shorter wavelength when the voltage is further increased. Finally, when the voltage was sufficiently high, the device became transparent, except some haze due to refractive index mismatching between LMW liquid crystal and CLC polymer.

EXAMPLE 5

This example also corresponds to the second embodiment. However, the device is made to be left-handed. The device contains the following components, i.e., nematic polymer in the range between 10–15%, non-crosslinkable left-handed cholesteric liquid crystal=85–90%%, and small amount photo initiator. The device thickness d=15 μm. Curing temperature: room-temperature. This device shows a strong light scattering effect at one side which was weakly rubbed and faced down during UV polymerization. However, the other side of the device does not exhibit the light scattering. Instead, it shows a very high reflection due to the planar texture, which is very similar to that shown in FIG. 9.

EXAMPLE 6

Figure 10:
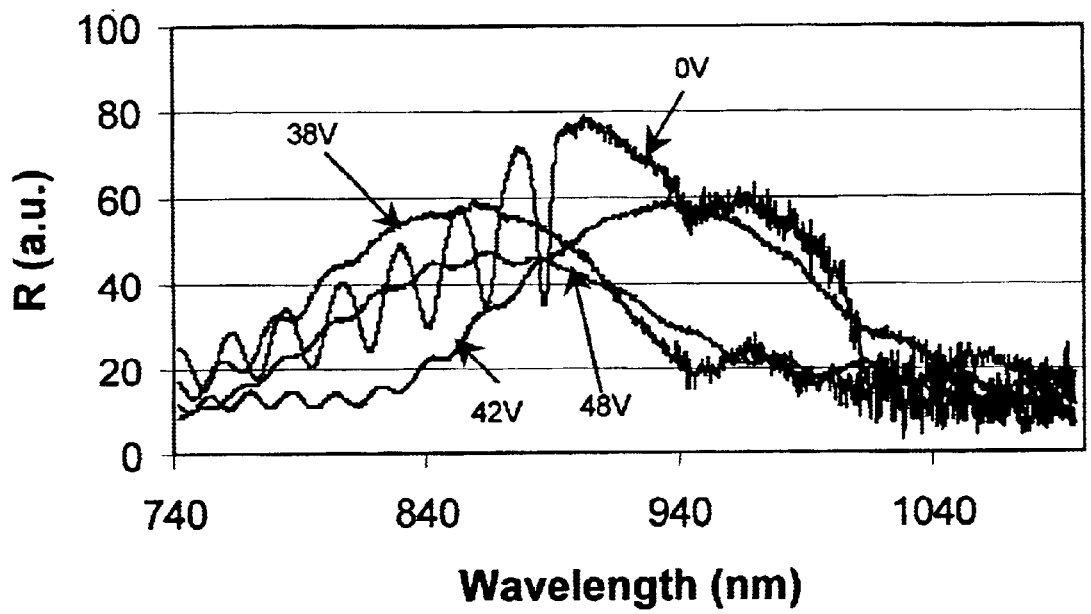
FIG. 10 illustrates a reflection spectrum of the spectrally tunable CLC as a function of applied voltage. Special attention should be paid to the wavelength "red" shift when the voltage is increased from 38 V to 42 V.

In this example, a unique tunable CLC device is presented. In experiment, the following CLC recipe has been used: CLC polymer in the range between 10–15%, nematic in the range between 70–85%, chiral less than 15%, and small amount of photo initiator. The thickness is 8 μm. Then its reflection spectrum were characterized under different voltages. The representative results are shown in FIG. 10.

Under zero voltage, the sample shows a quasi-broad bandwidth. When the voltage is increased to 38V, the bandwidth undergoes a slight shrinking and its center wavelength is shifted toward to shorter wavelength due to the pixel tilt.

Special attention should be drawn to the evidence that when the voltage is further increased to 42V, a "red" shift of this reflection peak takes place while its bandwidth as well as reflectivity is almost unchanged. This is caused by the CLC helix stretch. Finally, further increasing the voltage again shifts the reflection peak back to shorter wavelength.

EXAMPLE 7

In this example, a dichroic dye is introduced into the multiple state CLC medium to enable the device to absorb light in addition to reflection and/or scattering. This is corresponding to the third embodiment of the invention. Three broadband CLC polarizers have been made with different dye concentrations. The first polarizer has the CLC polymer in the range between 10–15%, nematic between 55%–65%=57.69%, chiral between 25–30%, small amount PI, and no the dye. The second polarizer contains a slightly doped dye concentration while the third polarizer contains a heavier dye concentration. All the CLC polarizers have a thickness of 8 μm.

Figure 11:
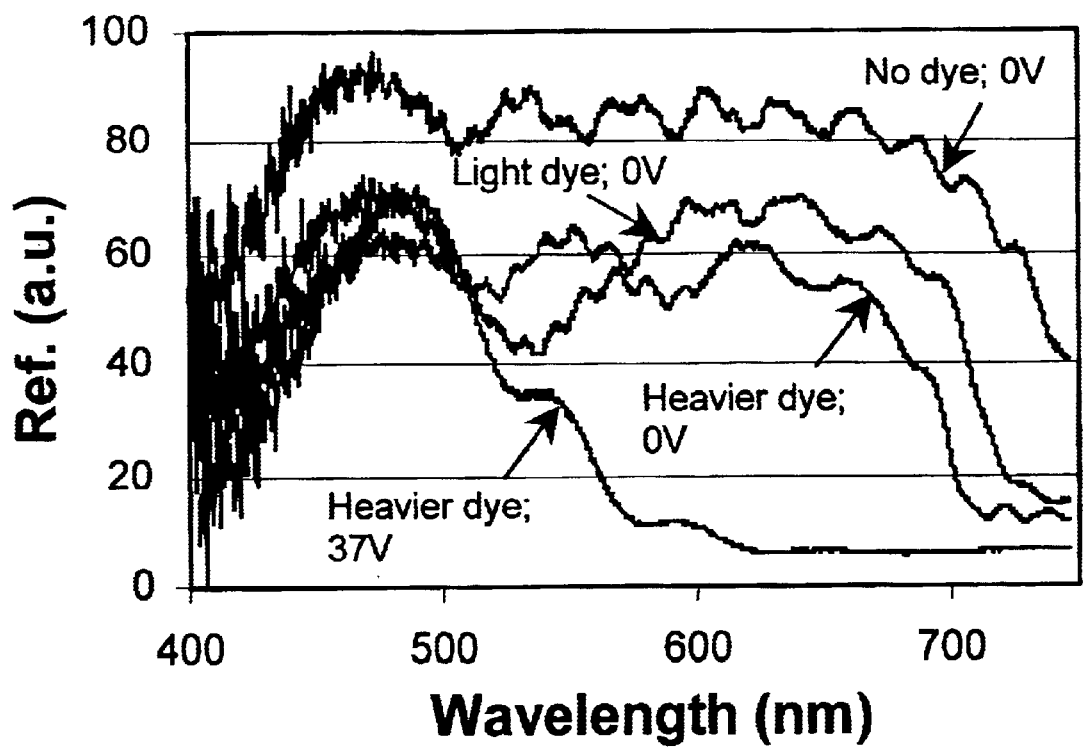
FIG. 11 illustrates a reflection spectrum of the three CLC polarizers with different dye concentration.

FIG. 11 shows the reflection spectra of the three CLC devices. From this figure, it is seen that the dye reduces both bandwidth and reflectivity due to its absorption.

The transmission spectra of the dyed CLC devices have been measured under different incident polarizations and voltages to examine the contrast ratio.

Figure 12A:
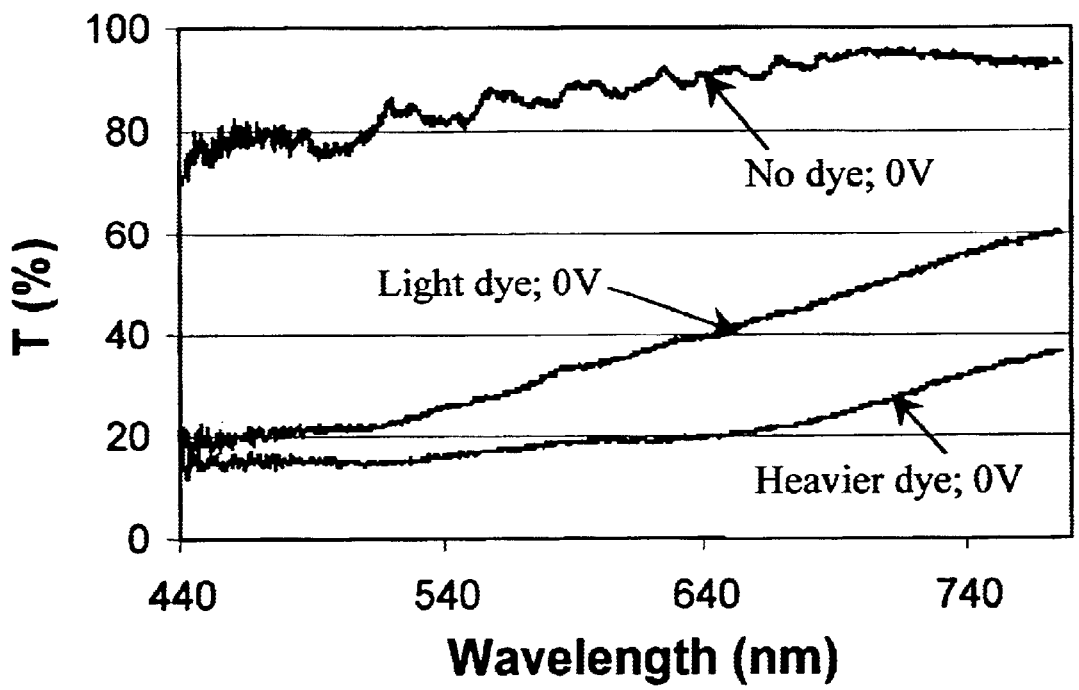
FIGS. 12a and 12b illustrate transmission spectra of the dyed CLC polarizer measured with left-handed light under 0V and 140V, respectively.
Figure 12B:
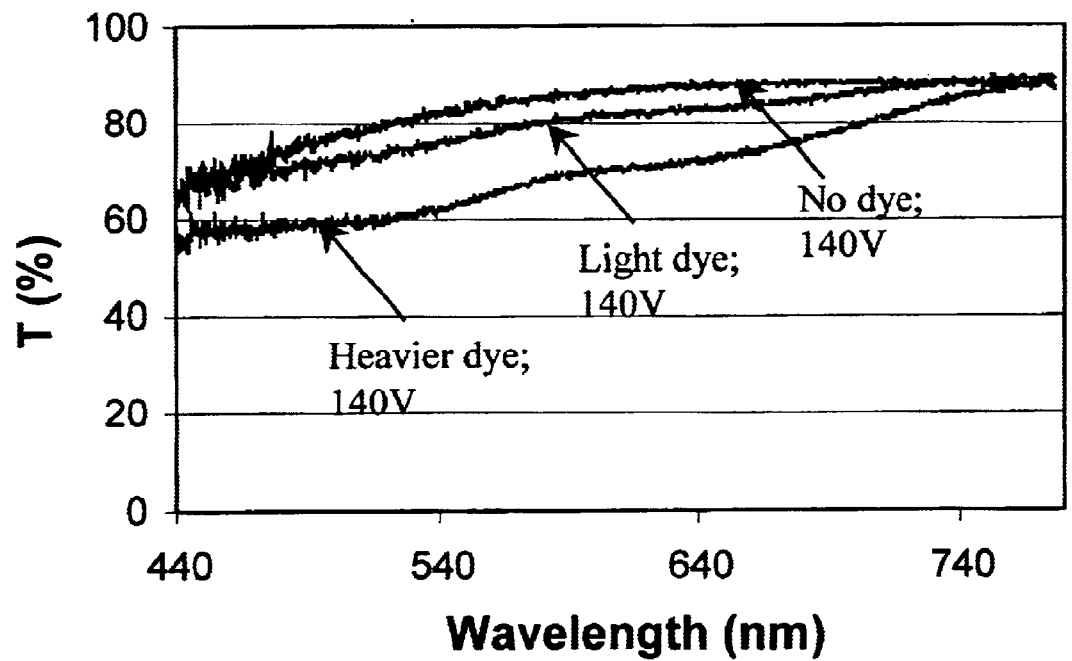
Figure 12C:
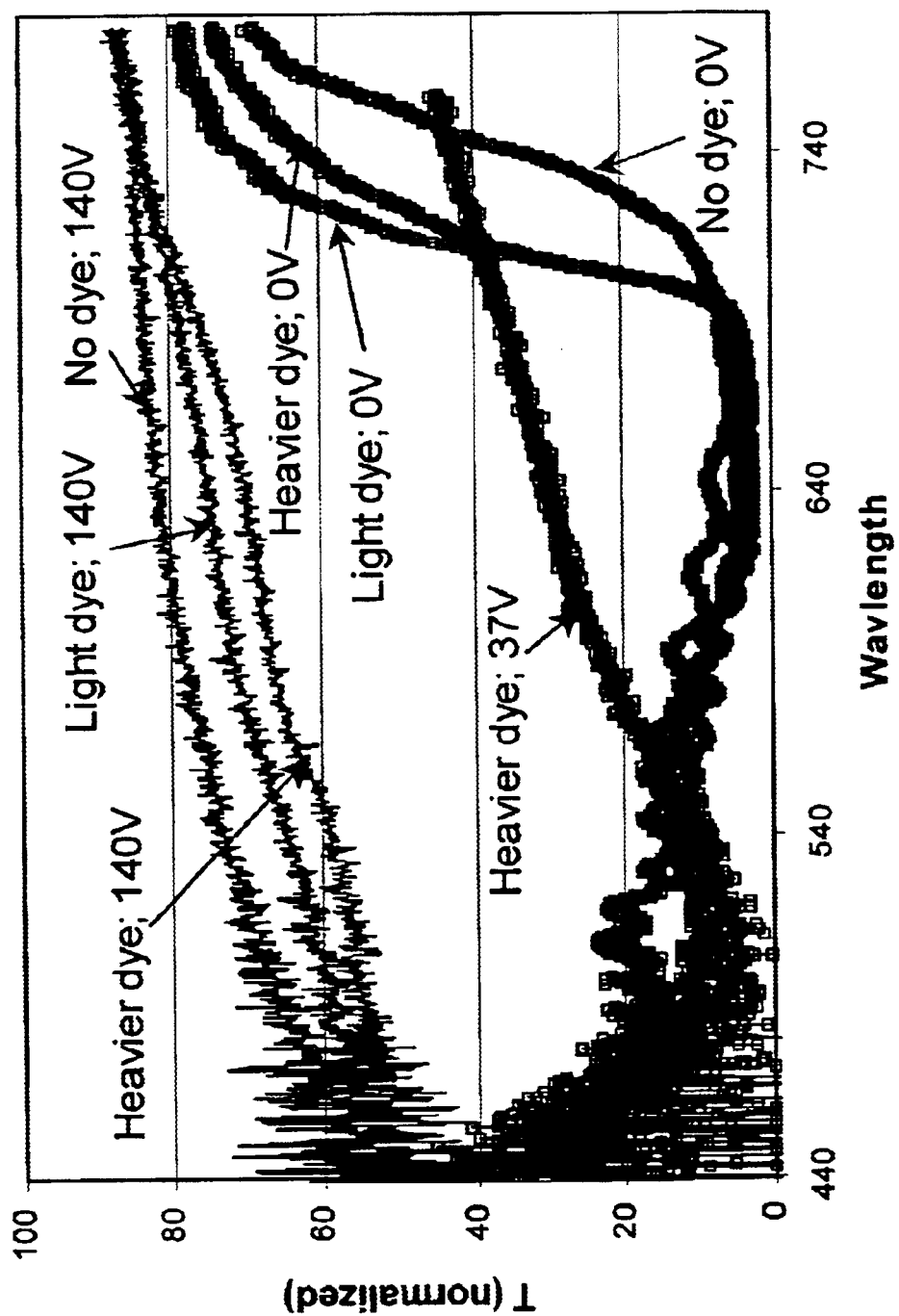
FIG. 12c illustrates the transmission spectra of the same CLC polarizers measured with right-handed light under 0 V and 140 V.

FIG. 12 shows the results, where FIGS. 12a and 12b show the transmission measured with left-handed light under zero and 140V, respectively, while FIG. 12c is the transmission spectra measured with right-handed light under zero and 140V, respectively.

Under zero voltage, the dye reduces the transmittance of both left- and right-handed incidence. However, when the device is switched into the homeotropic state, the dye absorption is decreased even though there is some residual absorption.

EXAMPLE 8

Figure 13:
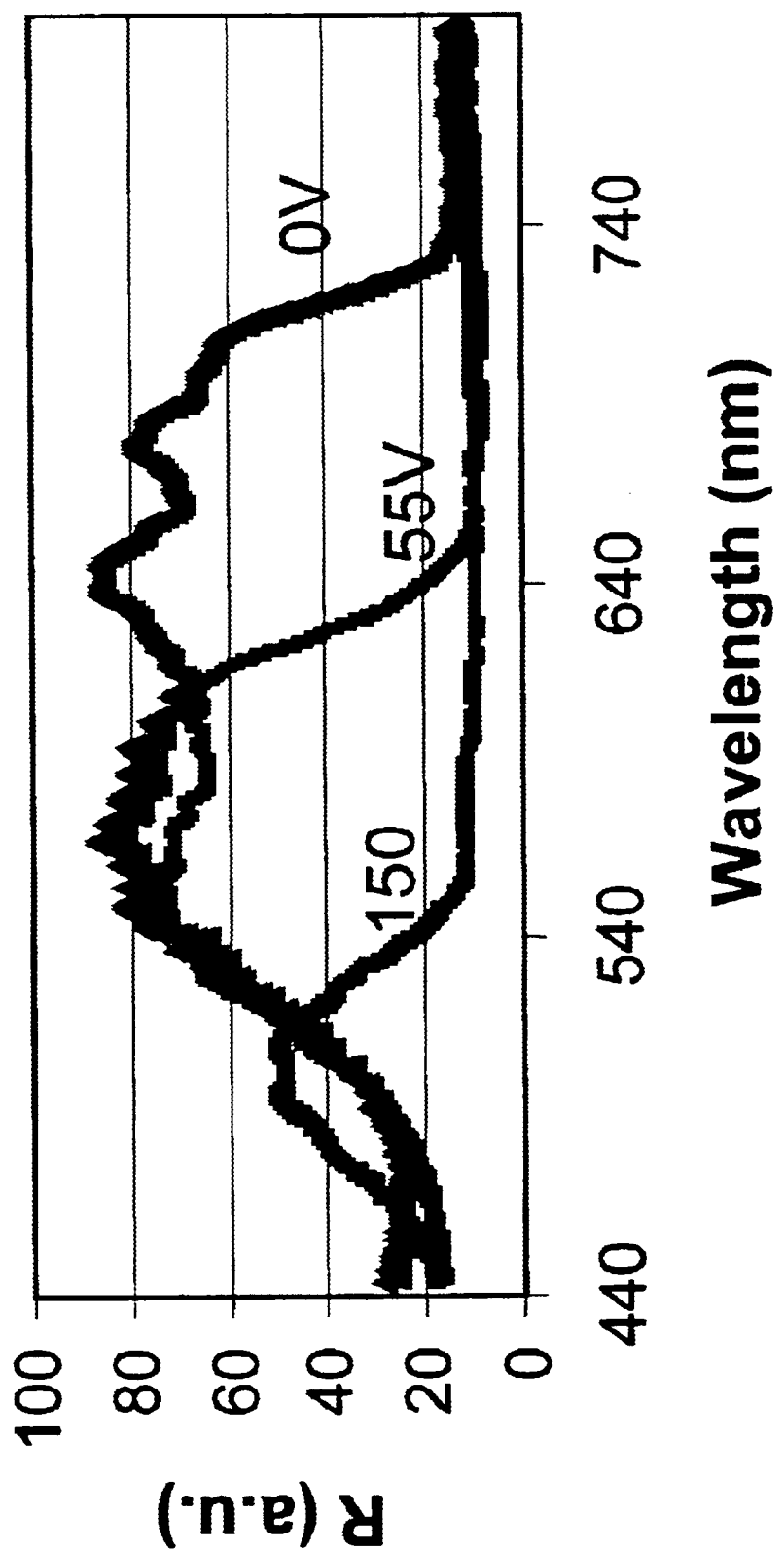
FIG. 13 illustrates a reflection spectrum of the polarizer which has the surfactant dopant.

In this example, using surfactant to reduce the response time of the invented device is presented. This is corresponding to the fourth embodiment of the invention. The device was made from the material recipe: CLC polymer in the range between 5–10%=7.0%, nematic between 60–70%, chiral between 25–30%, small amount photo initiator, and less than 0.5% surfactant. The device has a thickness of 15 μm. The reflection spectra of the device were measured under different voltage and the typical results are plotted in FIG. 13.

This device exhibits a spectral performance similar to that of the polarizer made from the liquid crystal recipe without the surfactant (refer to FIG. 6). In addition, its field switchability is close to that of the polarizer without the surfactant.

Next, the electro-optical response of the device was investigated and the result is compared to that of the device without surfactant. A 543 nm He—Ne laser was incident onto the sample upon which an amplified electric square wave pulse (120V with a width of 10 ms) from the voltage amplifier was applied. The transmitted signal was detected by a photo diode and sent to the computer to be processed.

Figure 14A:
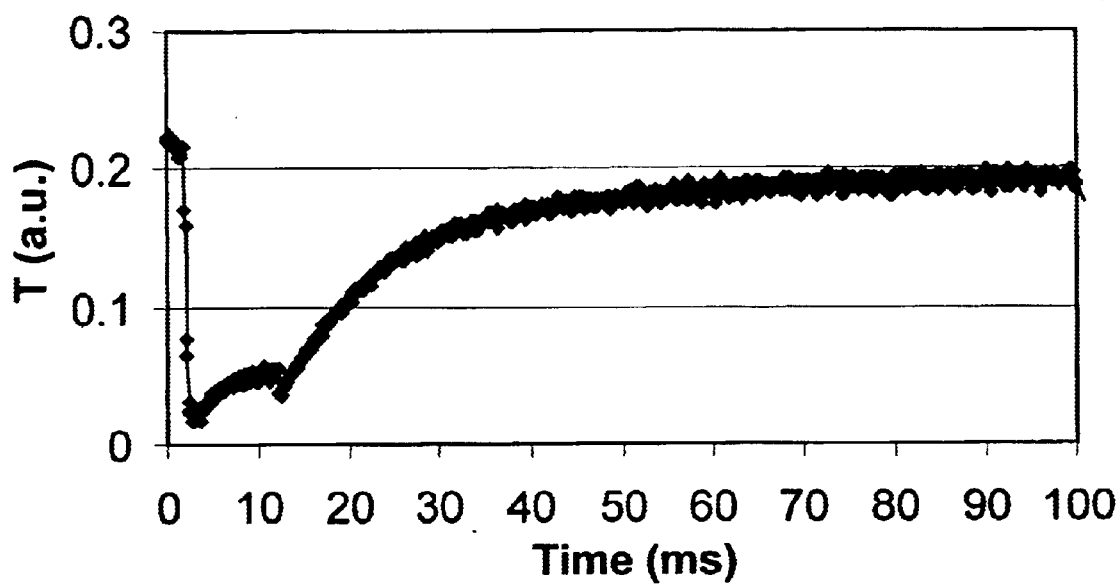
FIG. 14a illustrates an optical pulse signal from the polarizer without the surfactant.
Figure 14B:
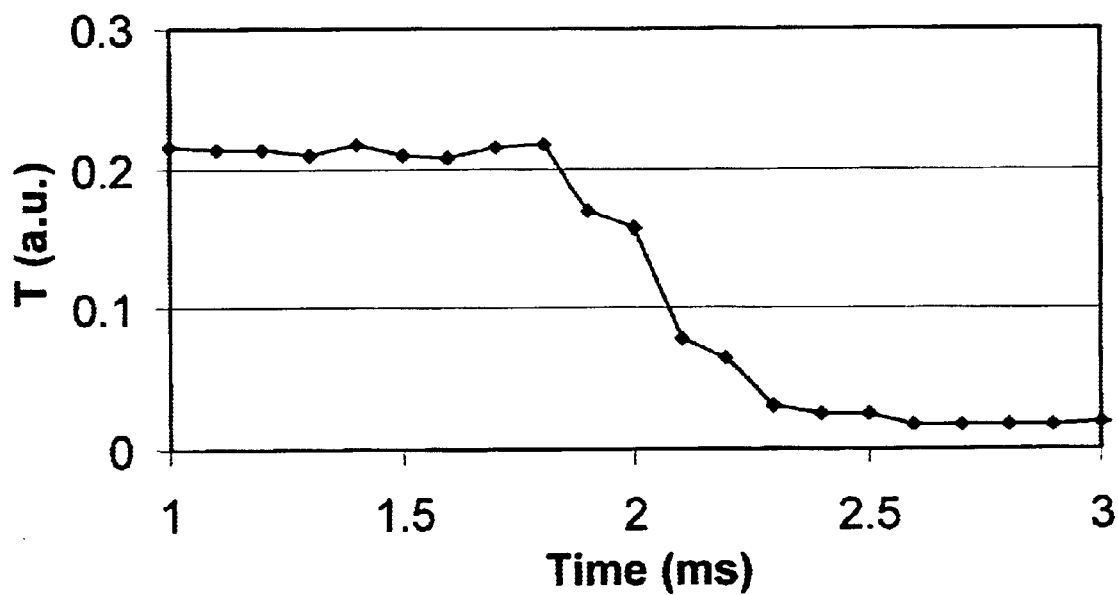
FIG. 14b shows the enlarged time scale.
Figure 15A:
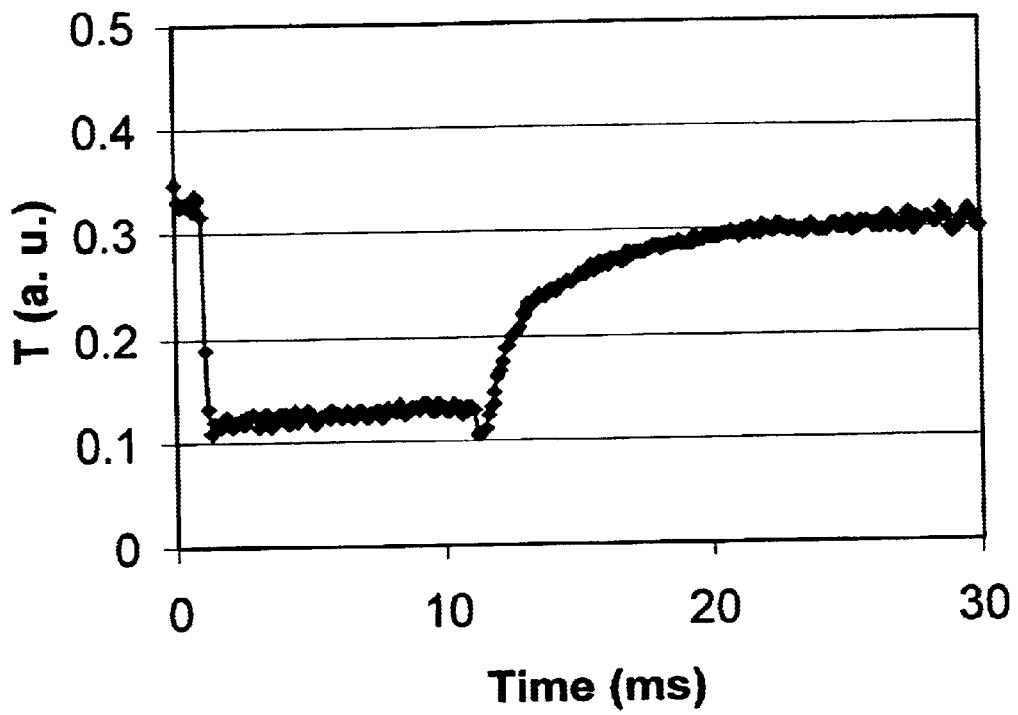
Figure 15B:
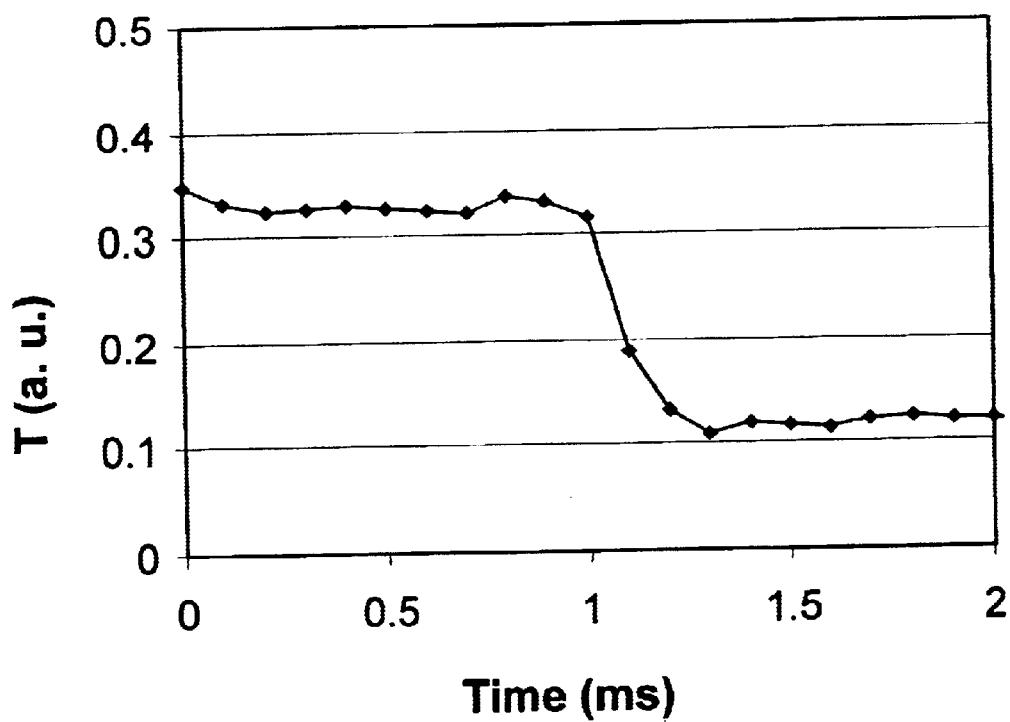
FIG. 15b shows the enlarged time scale.

FIG. 14 shows the temporal shape of the transmitted pulsed signal from the polarizer without the surfactant while FIG. 15 shows the transmitted pulse shape from the sample with the surfactant. It is seen from this preliminary experiment that both rise and fall times of the polarizer have been reduced by doping the surfactant.

It is understood by persons of ordinary skill in the art that many applications are possible for the present invention, but regardless of the application, the structure and principles of operation are within the spirit of this invention and the scope of the appended claims.

For example, for the following reasons, firstly, a fast switchable broadband reflective CLC is very useful for selective radiation protection.

Second, the present invention may be used to build a dual-mode reflective display that functions both in the visible and IR spectral regions. When the CLC is in the focal conic state, it can serve a normal reflective display device in the visible. However, when the CLC is triggered to reflect in the IR spectrum, the display device serves as an IR display.

Third, the present invention may serve as a light shutter element with an adjustable reflectance between 0% and 100%. Since the material attenuates the light via reflection rather than absorption (no dye is incorporated), it is particularly suitable for high-power applications.

Fourth, the new device may serve for privacy protection.

Fifth, the new device may serve as an innovative thin film control element for light power, polarizing, filtering, and reflecting optical devices, all having engineerable bandwidth.

Sixth, the new device may act as a see-through device for privacy control and energy conservation. All of the foregoing applications as they define particular products containing or comprising the single layer device of the invention, are considered to be aspects of such invention.

What is claimed is:

1. A cholesteric crystal device comprising:
   two optically transparent substrates;
   a liquid crystal having portions adapted for producing a plurality of optical states, said liquid crystal being arranged between the two optically transparent substrates;
   means for changing optical states of respective portions of said liquid crystal to produce a range of respective optical states including all optical states produced by said liquid crystal ranging from one state to any combination of broadband reflection, tunable narrow band reflection, light scattering, and transparency in accordance with an amount of voltage applied across said means for changing optical states.

2. The device according to claim 1, wherein said means for changing comprises:
   a first electrode electrically connected to a first of said two optically transparent substrates, and
   a second electrode electrically connected to a second of said two optically transparent substrates.

3. The device according to claim 1, wherein said portions of said liquid crystal having respective polymer concentrations for producing a particular predetermined optical state at a predetermined voltage applied by said means for changing optical states.

4. The device according to claim 3, wherein said liquid crystal is a composite material consisting of a crosslinkable liquid crystal material, a chiral additive, and a photo initiator.

5. The device according to claim 3, wherein said liquid crystal is a composite material comprising a crosslinkable liquid crystal material, a chiral additive, and a photo initiator.

6. The device according to claim 4, wherein said crosslinkable liquid crystal material comprises a nematic liquid crystal.

7. The device according to claim 4, wherein said crosslinkable liquid crystal material comprises a left-handed cholesteric liquid crystal.

8. The device according to claim 4, wherein said crosslinkable liquid crystal material comprises a right-handed cholesteric liquid crystal.

9. An electro-optically active device comprising two cholesteric crystal devices according to claim 4, comprising a first cholesteric crystal device comprising a right-handed cholesteric liquid crystal, and a second cholesteric crystal device comprises a left-handed cholesteric liquid crystal.

10. The device according to claim 9, further comprising a third liquid crystal device comprising a nematic liquid crystal.

11. The device according to claim 1, wherein said device only produces a light scattering state when no voltage is applied to said means for changing optical states.

12. The device according to claim 1, wherein said device only produces a light scattering state according to a predetermined nonzero voltage value being applied to said means for changing optical states.

13. The device according to claim 4, wherein said device only produces a light scattering state when no voltage is applied to said means for changing optical states.

14. The device according to claim 4, wherein said device only produces a light scattering state according to a predetermined nonzero voltage value being applied to said means for changing optical states.

15. The device according to claim 4, wherein the composite material of said liquid crystal includes a dichroic dye.

16. An electro-optically active device comprising two cholesteric crystal devices according to claim 15, comprising a first cholesteric crystal device comprising a right-handed cholesteric liquid crystal, and a second cholesteric crystal device comprises a left-handed cholesteric liquid crystal.

17. The device according to claim 14, wherein said device produces a light absorbing state when no voltage is applied to said means for changing optical states.

18. The device according to claim 14, wherein said device produces a light absorbing state according to a predetermined nonzero voltage value being applied to said means for changing optical states.

19. The device according to claim 2, the first electrode and the second electrode comprise Indium-Tin-Oxide (ITO).

20. The device according to claim 1, wherein said two substrates are coated with rubbed polyimide.

21. The device according to claim 3, wherein at least one portion of said portions of liquid crystal comprises a planar texture when no voltage is applied by said means for changing optical states.

22. The device according to claim 21, wherein said planar texture has a tilted helix.

23. The device according to claim 3, wherein at least one portion of said portions of liquid crystal comprises a planar texture when a nonzero voltage is applied by said means for changing optical states.

24. The device according to claim 23, wherein said planar texture has a tilted helix.

25. The device according to claim 3, wherein at least one portion of said portions of liquid crystal is comprises a focal conical state when no voltage is applied by said means for changing optical states.

26. The device according to claim 3, wherein at least one portion of said portions of liquid crystal comprises a focal conical state when a nonzero voltage is applied by said means for changing optical states.

27. The device according to claim 3, wherein at least one portion of said portions of liquid crystal comprises a homeotropic texture when no voltage is applied by said means for changing optical states.

28. The device according to claim 1, wherein the tunable narrow band reflection has a shifted wavelength.

29. The device according to claim 3, wherein the tunable narrow band reflection has a shifted wavelength.

30. The device according to claim 28, wherein the shifted wavelength has a blue shift.

31. The device according to claim 29, wherein the shifted wavelength has a blue shift.

32. The device according to claim 1, wherein an optical state of the liquid crystal scatters light in the visible range and reflects light in the infrared range.

33. The device according to claim 32, wherein the infrared range is a near-infrared range.

34. The device according to claim 33, wherein the near-infrared range has wavelengths ranging from approximately 800 nm to 1,200 nm.

35. The device according to claim 3, in an optical state of the liquid crystal scatters light in the visible range and reflects light in the infrared range.

36. The device according to claim 35, wherein the infrared range is a near-infrared range.

37. The device according to claim 36, wherein the near-infrared range has wavelengths ranging from approximately 800 nm to 1,200 nm.

38. The device according to claim 4, wherein an optical state of the liquid crystal scatters light in the visible range and reflects light in the infrared range.

39. The device according to claim 38, wherein the infrared range is a near-infrared range.

40. The device according to claim 39, wherein the near-infrared range has wavelengths ranging from approximately 800 nm to 1,200 nm.

41. The device according to claim 10, wherein an optical state of the liquid crystal scatters light in the visible range and reflects light in the infrared range.

42. The device according to claim 41, wherein the infrared range is a near-infrared range.

43. The device according to claim 42, wherein the near-infrared range has wavelengths ranging from approximately 800 nm to 1,200 nm.

44. The device according to claim 11, wherein an optical state of the liquid crystal scatters light in the visible range and reflects light in the infrared range.

45. The device according to claim 44, wherein the infrared range is a near-infrared range.

46. The device according to claim 45, wherein the near-infrared range has wavelengths ranging from approximately 800 nm to 1,200 nm.

47. The device according to claim 15, wherein an optical state of the liquid crystal scatters light in the visible range and reflects light in the infrared range.

48. The device according to claim 47, wherein the infrared range is a near-infrared range.

49. The device according to claim 48, wherein the near-infrared range has wavelengths ranging from approximately 800 nm to 1,200 nm.

50. The device according to claim 1, wherein optical states of portions of the liquid crystal both scatters and reflects light in the infrared range.

51. The device according to claim 1, wherein near-infrared light is scattered, and infrared light having wavelengths ranging from approximately 1,200 nm to 1,600 nm is reflected.

52. The device according to claim 3, wherein optical states of portions of the liquid crystal both scatters and reflects light in the infrared range.

53. The device according to claim 52, wherein near-infrared light is scattered, and infrared light having wavelengths ranging from approximately 1,200 nm to 1,600 nm is reflected.

54. The device according to claim 4, wherein optical states of portions of the liquid crystal both scatters and reflects light in the infrared range.

55. The device according to claim 54, wherein near-infrared light is scattered, and infrared light having wavelengths ranging from approximately 1,200 nm to 1,600 nm is reflected.

56. The device according to claim 10, wherein optical states of portions of the liquid crystal both scatters and reflects light in the infrared range.

57. The device according to claim 56, wherein near-infrared light is scattered, and infrared light having wavelengths ranging from approximately 1,200 nm to 1,600 nm is reflected.

58. The device according to claim 11, wherein optical states of portions of the liquid crystal both scatters and reflects light in the infrared range.

59. The device according to claim 58, wherein near-infrared light is scattered, and infrared light having wavelengths ranging from approximately 1,200 nm to 1,600 nm is reflected.

60. The device according to claim 15, wherein optical states of portions of the liquid crystal both scatters and reflects light in the infrared range.

61. The device according to claim 60, wherein near-infrared light is scattered, and infrared light having wavelengths ranging from approximately 1,200 nm to 1,600 nm is reflected.

62. The device according to claim 9, further comprising a third cholesteric liquid crystal device arranged between said first cholesteric crystal device and said second cholesteric crystal device.

63. The device according to claim 62, wherein said first cholesteric liquid crystal device includes a first dichroic dye.

64. The device according to claim 63, wherein said second cholesteric liquid crystal device includes a second dichroic dye.

65. The device according to claim 64, wherein said third cholesteric liquid crystal device includes a third dichroic dye.

66. The device according to claim 1, wherein an optical state of the liquid crystal reflects ultra-violet light.

67. The device according to claim 3, wherein an optical state of the liquid crystal reflects ultra-violet light.

68. The device according to claim 4, wherein an optical state of the liquid crystal reflects ultra-violet light.

69. The device according to claim 9, wherein an optical state of at least one liquid crystal reflects ultra-violet light.

70. The device according to claim 15, wherein an optical state the liquid crystal reflects ultra-violet light.

71. The device according to claim 1, wherein an optical state of the liquid crystal reflects visible light.

72. The device according to claim 3, wherein an optical state of the liquid crystal reflects visible light.

73. The device according to claim 4, wherein an optical state of the liquid crystal reflects visible light.

74. The device according to claim 9, wherein an optical state at least one liquid crystal reflects visible light.

75. The device according to claim 15, wherein an optical state of the liquid crystal reflects visible light.

76. The device according to claim 1, wherein an optical state of the liquid crystal reflects IR light.

77. The device according to claim 3, wherein an optical state of the liquid crystal reflects IR light.

78. The device according to claim 4, wherein an optical state of the liquid crystal reflects IR light.

79. The device according to claim 9, wherein an optical state at least one liquid crystal reflects IR light.

80. The device according to claim 15, wherein an optical state of the liquid crystal reflects IR light.

81. The device according to claim 1, wherein an optical state of the liquid crystal scatters ultra-violet light.

82. The device according to claim 3, wherein an optical state of the liquid crystal scatters ultra-violet light.

83. The device according to claim 4, wherein an optical state of the liquid crystal scatters ultra-violet light.

84. The device according to claim 9, wherein an optical state of at least one liquid crystal scatters ultra-violet light.

85. The device according to claim 15, wherein an optical state of the liquid crystal scatters ultra-violet light.

86. The device according to claim 1, wherein an optical state of the liquid crystal scatters visible light.

87. The device according to claim 3, wherein an optical state of the liquid crystal scatters visible light.

88. The device according to claim 4, wherein an optical state of the liquid crystal scatters visible light.

89. The device according to claim 9, wherein an optical state of at least one liquid crystal scatters visible light.

90. The device according to claim 15, wherein an optical state of the liquid crystal scatters visible light.

91. The device according to claim 1, wherein an optical state of the liquid crystal scatters IR light.

92. The device according to claim 3, wherein an optical state of the liquid crystal scatters IR light.

93. The device according to claim 4, wherein an optical state of the liquid crystal scatters IR light.

94. The device according to claim 9, wherein an optical state of at least one liquid crystal scatters IR light.

95. The device according to claim 15, wherein an optical state of the liquid crystal scatters IR light.

96. The device according to claim 15, wherein an optical state of the liquid crystal absorbs ULTRA-VIOLET light.

97. The device according to claim 16, wherein an optical state of at least one liquid crystal absorbs ULTRA-VIOLET light.

98. The device according to claim 15, wherein an optical state of the liquid crystal absorbs VISIBLE light.

99. The device according to claim 16, wherein an optical state of at least one liquid crystal absorbs VISIBLE light.

100. The device according to claim 1, further comprising a surfactant.

101. The device according to claim 4, further comprising a surfactant.

102. The device according to claim 15, further comprising a surfactant.

103. The device according to claim 16, further comprising a surfactant.

104. The device according to claim 16, wherein an optical state of said first cholesteric liquid crystal absorbs visible light, and an optical state of said second cholesteric liquid crystal absorbs ultraviolet light.

105. The device according to claim 9, wherein an optical state of said first cholesteric liquid crystal absorbs visible light, and an optical state of said second cholesteric liquid crystal absorbs infrared light.

106. The device according to claim 9, wherein an optical state of said first cholesteric liquid crystal absorbs infrared light, and an optical state of said second cholesteric liquid crystal absorbs ultraviolet light.

107. The device according to claim 10 that absorbs infrared light, visible light, and ultraviolet light.

108. The device according to claim 107 that absorbs infrared light, visible light, and ultraviolet light at a first predetermined voltage applied to said means for changing optical states, and absorbs no more than two of infrared light, visible light, and ultra violet light at a second predetermined voltage applied to said means for changing optical states.

109. The device according to claim 4, wherein the photo initiator is a visible photo initiator.

110. The device according to claim 4, wherein the photo initiator is a UV photo initiator.

111. An electro-optically active device comprising two identical cholesteric devices according to claim 4, and a half-wavelength retarder being arranged between the two cholesteric crystal devices.

112. The device according to claim 111, wherein an optical state of at least one the liquid crystal reflects ultra-violet light.

113. The device according to claim 111, wherein an optical state of at least one the liquid crystal scatters ultra-violet light.

114. The device according to claim 111, wherein an optical state of at least one the liquid crystal reflects visible light.

115. The device according to claim 111, wherein an optical state of at least one the liquid crystal reflects IR light.

116. The device according to claim 111, wherein an optical state of at least one the liquid crystal scatters visible light.

117. The device according to claim 111, wherein an optical state of at least one the liquid crystal scatters IR light.

118. The electro-optically active device according to claim 9, further comprising a half-wavelength retarder being arranged between the two cholesteric crystal devices.

119. The device according to claim 118, wherein an optical state of at least one the liquid crystal reflects ultra-violet light.

120. The device according to claim 118, wherein an optical state of at least one the liquid crystal scatters ultra-violet light.

121. The device according to claim 118, wherein an optical state of at least one the liquid crystal reflects visible light.

122. The device according to claim 118, wherein an optical state of at least one the liquid crystal reflects IR light.

123. The device according to claim 118, wherein an optical state of at least one the liquid crystal scatters IR light.

124. An electro-optically active device comprising two identical cholesteric devices according to claim 15, and a half-wavelength retarder being arranged between the two cholesteric crystal devices.

125. The device according to claim 15, wherein an optical state of the liquid crystal absorbs IR light.

126. The device according to claim 16, wherein an optical state of at least one liquid crystal absorbs IR light.

127. The device according to claim 124, wherein an optical state of at least one the liquid crystal absorbs IR light.

128. The device according to claim 16, wherein an optical state of at least one the liquid crystal absorbs IR light.

129. The device according to claim 124, wherein an optical state of at least one the liquid crystal absorbs VISIBLE light.

130. The device according to claim 124, wherein an optical state of at least one the liquid crystal absorbs ULTRA-VIOLET light.

131. The electro-optically active device according to claim 16, further comprising a half-wavelength retarder being arranged between the two cholesteric crystal devices.

132. The device according to claim 131, wherein an optical state of at least one the liquid crystal absorbs VISIBLE light.

133. The device according to 124, wherein an optical state of at least one the liquid crystal absorbs ULTRA-VIOLET light.

134. The device according to claim 1, wherein said means for changing optical states comprises electrodes which are patterned.

135. The device according to claim 3, wherein the first and second electrodes are patterned.

136. The device according to claim 9, wherein the first and second electrodes are patterned.

137. The device according to claim 15, wherein the first and second electrodes are patterned.

138. The device according to claim 111, wherein the first and second electrodes are patterned.

139. The device according to claim 118, wherein the first and second electrodes are patterned.

140. The device according to claim 1, wherein said means for changing optical states comprises electrodes which are pixilated.

141. The device according to claim 3, wherein the first and second electrodes are pixilated.

142. The device according to claim 9, wherein the first and second electrodes are pixilated.

143. The device according to claim 15, wherein the first and second electrodes are pixilated.

144. The device according to claim 91, wherein the first and second electrodes are pixilated.

145. The device according to claim 98, wherein the first and second electrodes are pixilated.

146. The device according to claim 101, wherein the first and second electrodes are pixilated.

147. The device according to claim 122, wherein the first and second electrodes are pixilated.

148. The device according to claim 123, wherein the first and second electrodes are pixilated.

149. The device according to claim 124, wherein the first and second electrodes are 150. A method for producing a cholesteric crystal device comprising the steps of:
(a) providing two optically transparent substrates to form a cell;
(b) providing a liquid crystal having portions adapted for producing a plurality of optical states, said liquid crystal being arranged between the two optically transparent substrates;
(c) providing means for changing optical states of respective portions of said liquid crystal to produce a range of respective optical states including all optical states produced by said liquid crystal ranging from one state to any combination of broadband/reflection, tunable narrow band reflection, light scattering, and transparency in accordance with an amount of voltage applied across said means for changing optical states.

151. The method according to claim 150, wherein the liquid crystal provided in step (b) comprises wherein said liquid crystal is a composite material consisting of a crosslinkable liquid crystal material, a chiral additive, and a photo initiator.

152. The method according to claim 150, wherein the liquid crystal further comprises a first dichroic dye, and said range of respective optical states includes light absorption.

153. The method according to claim 150, wherein the photo initiator operates under visible light.

154. The method according to claim 150, wherein the photo initiator operates under UV light.

155. The method according to claim 150, wherein the liquid crystal is adapted for producing a plurality of optical states in step (b) by:
(i) preparing the composite mixture material;
(ii) filling the composite mixture the cell, said cell having an Indium-Tin-Oxide (ITO) and rubbed polyimide coating; and
(iii) exposing the cell to ultraviolet light for a predetermined period for photo polymerization.

156. The method according to claim 153, wherein the liquid crystal is adapted for producing a plurality of optical states in step (b) by:
(i) preparing the composite mixture material;
(ii) filling the composite mixture in the cell, said cell having an Indium-Tin-Oxide (ITO) and a rubbed polyimide coating; and
(iii) exposing the cell to visible light a predetermined period for photo polymerization.

157. The method according to claim 155, wherein the cell has more of a rubbed polyimide coating on a first of said two substrates than on a second of said two substrates.

158. The method according to claim 156, wherein the cell has more of a rubbed polyimide coating on a first of said two substrates than on a second of said two substrates.

159. A method for producing an electro-optically active device comprising three cholesteric liquid crystal devices comprising the liquid crystal according to claim 151, said method comprising:
providing a right-handed multi-state cholesteric liquid crystal (CLC) device;
providing a left-handed multi-state cholesteric liquid crystal device (CLC); and
providing a third liquid crystal device arranged between said right-handed CLC device and said left handed CLC device; and
is introducing a dichroic dye into said third liquid crystal device.

160. A method for producing an electro-optically active device comprising three cholesteric liquid crystal devices comprising the liquid crystal according to claim 152, said method comprising:

provide a right-handed multi-state cholesteric liquid crystal (CLC) device;

providing a left-handed multi-state cholesteric liquid crystal device (CLC); and providing a third liquid crystal device arranged between said right-handed CLC device and said left handed CLC device; and introducing a second dichroic dye into said one of said liquid crystal devices of said electro-optically active device.

161. The method according to claim 160, further comprising:

introducing a third dichroic dye so that all three of the liquid crystal devices have a dichroic dye, wherein each of the dichroic dyes have different concentrations.

162. The method according to claim 161, wherein the means for changing the optical states includes providing voltages ranging from zero to a predetermined value.

163. The method according to claim 161, wherein the means for changing the optical states includes providing voltages ranging from zero to a predetermined value.

164. The method according to claim 162, wherein the means for changing the optical states includes providing voltages ranging from zero to a predetermined value.

165. The method according to claim 159, wherein the means for changing the optical states includes providing voltages ranging from zero to a predetermined value.

166. The method according to claim 160, wherein the means for changing the optical states includes providing voltages ranging from zero to a predetermined value.

167. The method according to claim 161, wherein the means for changing the optical states includes providing voltages ranging from zero to a predetermined value.

168. The method according to claim 160, further comprising (d) introducing a surfactant for reducing response time.

169. The method according to claim 160, further comprising introducing a surfactant for reducing response time.

170. The method according to claim 162, further comprising introducing a surfactant for reducing response time.

* * * * *